(12) United States Patent
Ren et al.

(10) Patent No.: US 8,604,101 B2
(45) Date of Patent: Dec. 10, 2013

(54) PROCESS FOR PRODUCING AQUEOUS DISPERSIONS OF THERMOPLASTIC POLYESTERS

(75) Inventors: Liqun Ren, Mannheim (DE); Gimmy Alex Fernandez Ramirez, Ludwigshafen (DE); Motonori Yamamoto, Mannheim (DE); Hermann Seyffer, Heidelberg (DE); Gabriel Skupin, Speyer (DE)

(73) Assignee: BASF SE (DE)

( * ) Notice: Subject to any disclaimer, the term of this patent is extended or adjusted under 35 U.S.C. 154(b) by 138 days.

(21) Appl. No.: 13/070,942

(22) Filed: Mar. 24, 2011

(65) Prior Publication Data

US 2011/0237744 A1 Sep. 29, 2011

Related U.S. Application Data

(60) Provisional application No. 61/316,930, filed on Mar. 24, 2010.

(51) Int. Cl.
*B01F 3/08* (2006.01)
*B01F 7/20* (2006.01)
*C08K 5/41* (2006.01)

(52) U.S. Cl.
USPC ........... 523/324; 523/318; 523/333; 524/368; 524/603; 524/604

(58) Field of Classification Search
USPC .......... 524/368, 603, 604; 523/223, 318, 324, 523/333
See application file for complete search history.

(56) References Cited

U.S. PATENT DOCUMENTS

| | | |
|---|---|---|
| 4,045,418 A | 8/1977 | Sinclair |
| 4,057,537 A | 11/1977 | Sinclair |
| 4,789,727 A | 12/1988 | Sun |
| 5,142,023 A | 8/1992 | Gruber et al. |
| 5,247,058 A | 9/1993 | Gruber et al. |
| 5,247,059 A | 9/1993 | Gruber et al. |
| 5,310,865 A | 5/1994 | Enomoto et al. |
| 5,428,126 A | 6/1995 | Kashima et al. |
| 5,440,008 A | 8/1995 | Ichikawa et al. |
| 5,484,881 A | 1/1996 | Gruber et al. |
| 5,508,394 A * | 4/1996 | Kappes et al. ............... 536/55.2 |
| 6,018,004 A | 1/2000 | Warzelhan et al. |
| 6,103,858 A | 8/2000 | Yamamoto et al. |
| 6,114,042 A | 9/2000 | Warzelhan et al. |
| 6,201,034 B1 | 3/2001 | Warzelhan et al. |
| 6,245,346 B1 | 6/2001 | Rothen-Weinhold et al. |
| 6,303,677 B1 | 10/2001 | Warzelhan et al. |
| 6,521,679 B1 | 2/2003 | Okada et al. |
| 6,821,703 B2 * | 11/2004 | Uno et al. ................. 430/137.19 |
| 7,304,172 B2 | 12/2007 | Coates et al. |
| 2002/0076639 A1 | 6/2002 | Uno et al. |
| 2004/0038851 A1* | 2/2004 | Aubay et al. ................. 510/475 |
| 2005/0058712 A1 | 3/2005 | Serpelloni et al. |

FOREIGN PATENT DOCUMENTS

| | | |
|---|---|---|
| DE | 10024813 A1 | 11/2001 |
| EP | 488617 A2 | 6/1992 |
| EP | 1264860 A1 | 12/2002 |
| EP | 1302502 A1 | 4/2003 |
| JP | 48037974 B | 11/1973 |
| JP | 48037975 B | 11/1973 |
| WO | WO-94/05484 A1 | 3/1994 |
| WO | WO-96/15173 A1 | 5/1996 |
| WO | WO-96/18591 A1 | 6/1996 |
| WO | WO-97/41836 A1 | 11/1997 |
| WO | WO-98/09613 A1 | 3/1998 |
| WO | WO-98/12245 A1 | 3/1998 |
| WO | WO-2004/067632 A1 | 1/2004 |
| WO | WO-2007/015039 A1 | 2/2007 |
| WO | WO-2009/127555 A1 | 10/2009 |
| WO | WO-2009/127556 A1 | 10/2009 |

* cited by examiner

*Primary Examiner* — Tae H Yoon
(74) *Attorney, Agent, or Firm* — Novak Druce Connolly Bove + Quigg LLP

(57) ABSTRACT

The present invention relates to a process for producing aqueous dispersions of thermoplastic polymers which have a plurality of ester groups and/or carbonate groups in the main polymer chain and which have an acid number of less than 5 mg KOH/g, in particular at most 3 mg KOH/g, and which have a zero-shear viscosity $\eta_0$ (180° C.) of at least 60 Pa·s at 180° C. The invention also relates to the polymer dispersions obtainable by said process, and to the use thereof.

45 Claims, No Drawings

PROCESS FOR PRODUCING AQUEOUS DISPERSIONS OF THERMOPLASTIC POLYESTERS

CROSS-REFERENCE TO RELATED APPLICATION

This Application claims the benefit of U.S. Provisional Application No. 61/316,930 filed on Mar. 24, 2010 which is incorporated by reference.

The present invention relates to a process for producing aqueous dispersions of thermoplastic polymers which have a plurality of ester groups and/or carbonate groups in the main polymer chain and which have an acid number of less than 5 mg KOH/g, in particular at most 3 mg KOH/g, and which have a zero-shear viscosity $\eta_0$ (180° C.) of at least 60 Pa·s at 180° C. The invention also relates to the polymer dispersions obtainable by said process, and to the use thereof.

Aqueous dispersions of thermoplastic polymers which have a plurality of ester groups and/or carbonate groups in the main polymer chain and which have an acid number of at most 10 mg KOH/g, in particular polyesters, and specifically biodegradable polyesters, are of particular interest for many applications, in particular as binders. Unlike aqueous polymer dispersions in which the main chain of the polymer is composed of carbon atoms, aqueous dispersions of polymers which have a plurality of ester groups and/or carbonate groups in the main chain of the polymer cannot generally be produced by an emulsion-polymerization process. Instead, it is usually necessary to produce polymers of this type by a polycondensation route and then to convert them to an aqueous dispersion. In principle, there are many ways of doing this.

Firstly, a solution of the polymer in an organic, preferably water-miscible, solvent can be mixed with the aqueous dispersion medium, and the organic solvent can in turn be removed. However, it is generally not possible to achieve complete removal of the organic solvents without accepting some loss of quality of the dispersion, for example caused by molecular-weight degradation of the polymer due to hydrolysis, and/or by destabilization of the disperse phase.

Polymers with a high acid number can in turn be emulsified in water, by using a base to alkalinify the aqueous dispersion medium, with the aim of deprotonating the carboxy groups and thus promoting self-emulsification of the polymer. This type of procedure is described by way of example in WO 98/12245. The process described in that document is naturally not applicable to the production of aqueous dispersions of the polymers defined in the introduction, because they have a low acid number.

Another possibility consists in emulsifying a melt of the polymer in the aqueous dispersion medium, and then cooling. However, there is the risk here that molecular-weight degradation will occur under these conditions, caused by hydrolysis of the ester groups or of the carbonate groups in the main chain of the polymer.

By way of example, EP 1302502 A1 describes a process for producing aqueous dispersions of biodegradable polyesters, by using a kneading process to incorporate a melt of the polyester into an aqueous solution of a surfactant substance which has low surface tension. Care has to be taken here that the ratio of the viscosity (zero-shear viscosity $\eta_0$) of the polymer melt does not deviate too greatly from the viscosity of the aqueous solution, since otherwise the dispersions obtained are not stable. The result of this is firstly that it is only possible to produce high-viscosity dispersions of the polyester with viscosity values above 2 Pa·s, and secondly that the polyesters that can be used are only those having sufficiently low zero-shear viscosity $\eta_0$ at the incorporation temperature. However, the performance characteristics of polyesters of that type are unsatisfactory for many purposes. Furthermore, molecular-weight degradation of the polyester frequently occurs under these conditions.

US 2005/058712 in turn describes a process for producing aqueous dispersions of biodegradable polyesters, by emulsifying a melt made of a mixture of the polyester with an additive that reduces melt viscosity, e.g. triacetin, in an aqueous solution of a surfactant substance. However, the disadvantage has proven to be the addition of the additive that reduces melt viscosity, which naturally remains within the dispersion, with resultant impairment of performance characteristics. Furthermore, the only polyesters that can be emulsified in this way are those whose zero-shear viscosity $\eta_0$ is sufficiently low at the incorporation temperature. However, the performance characteristics of polyesters of that type are unsatisfactory for many purposes.

US 2002/0076639 describes inter alia the production of aqueous polyester dispersions of end-group-modified polyesters which have carboxylic acid groups and which have an acid number that is preferably from 7 to 70 mg KOH/g of polyester, via melt-emulsification, using a rotor-stator mixer. The acid number gives the polyester particles amphiphilic character, which promotes emulsification. The use of the rotor-stator mixer here serves to produce spherical polyester particles.

U.S. Pat. No. 6,521,679 describes the production of polyester dispersions of water-insoluble polyesters via melt-emulsification of mixtures of the water-insoluble polyester with water-soluble polyester resins which have from 0.1 to 1.5 mmol of sulfonic acid groups per gram of the water-soluble polyester. The melt-emulsification process uses an extruder and gives high-viscosity dispersions, which can be diluted with water. The water-insoluble polyesters used have low zero-shear viscosity.

SUMMERY OF THE INVENTION

It is therefore an object of the present invention to provide a process for producing aqueous dispersions of the polymers defined in the introduction. In particular, the process should allow polymers which have a plurality of ester groups and/or carbonate groups in the main polymer chain to be converted to an aqueous dispersion without significant molecular-weight degradation.

It has now been found that, although they have comparatively high zero-shear viscosity $\eta_0$ (180° C.), thermoplastic polymers of the type defined in the introduction can be emulsified in an aqueous dispersion medium even without addition of flow aids and/or without any significant increase in the viscosity of the aqueous phase, via addition of thickeners, if a composition of the polymer which is composed of at least 99% by weight of the polymer is introduced, at a temperature above the melting or softening point of the polymer, by means of an apparatus which comprises at least one rotor-stator mixer, into an aqueous dispersion medium which comprises at least one surfactant substance, and the resultant aqueous emulsion of the polymer is quenched.

A DETAILED DESCRIPTION OF THE INVENTION

Said object was therefore achieved via the process explained in more detail below. Accordingly, the present invention provides a process for producing aqueous dispersions of thermoplastic polymers which have a plurality of ester groups and/or carbonate groups in the main polymer chain and which have an acid number of less than 5 mg KOH/g, in particular less than 3 mg KOH/g, and which have a zero-shear viscosity $\eta_0$ (180° C.) of at least 60 Pa·s, frequently at least 80 Pa·s, in particular at least 100 Pa·s, e.g. from 60 to 20,000 Pa·s, in particular from 80 to 15,000 Pa·s, and specifically from 100 to 10,000 Pa·s, at 180° C., where a composition which comprises the polymer and which is composed of at least 99% by weight of the polymer is introduced, at a temperature above the melting or softening point of the polymer, into an aqueous dispersion medium which comprises at least one surfactant substance, and the resultant aqueous emulsion of the polymer is quenched, which comprises carrying out the introduction of the composition of the polymer into the aqueous dispersion medium in a mixing apparatus which has at least one rotor-stator mixer.

The process of the invention is attended by a number of advantages. Firstly, it permits production of aqueous dispersions of thermoplastic polymers with the properties mentioned here, and these cannot be converted to aqueous dispersions by the processes in the teaching of the prior art. The aqueous dispersions obtainable by the process of the invention and comprising the fusible polymers are therefore novel and are therefore equally provided by the present application.

Unlike in the processes of the prior art, neither the use of organic solvents nor the addition of means of reducing melt viscosity is required. The process of the invention moreover does not lead to, or does not lead to any significant, molecular-weight degradation of the type that would in principle have been expected on the basis of the ester functions or carbonate functions comprised within the main chain of the polymers. Furthermore, the process of the invention can produce low-viscosity dispersions with viscosity values of 2 Pa·s (Brookfield, 20° C., determined to DIN EN ISO 2555) or lower, and these viscosity values are even achievable at solids contents of 40% by weight or above.

In the process of the invention, the thermoplastic polymer is introduced into the aqueous dispersion medium, in the case of an amorphous polymer this occurs at a temperature above the softening point of the polymer, and in the case of a crystalline or semicrystalline polymer this occurs above the melting point of the polymer. The softening point of amorphous polymers is the temperature corresponding to the glass transition temperature as can be determined by way of example by means of dynamic scanning calorimetry (DSC) to ASTM D3418 or preferably to DIN 53765, or via dynamic mechanical analysis (DMA). The melting point is the temperature which causes melting or softening of the polymer, and which can be determined in a manner known per se by means of dynamic scanning calorimetry (DSC) to DIN 53765 or differential thermal analysis (DTA).

An amorphous polymer is a polymer which has less than 1% by weight of crystalline regions. A crystalline or semicrystalline polymer is a polymer which has more than 1% by weight of crystalline regions, in particular at least 5% by weight. The degree of crystallinity of a polymer can be determined in a manner known per se via X-ray diffractometry or via thermochemical methods, such as DTA or DSC in a manner known per se.

In the invention, the introduction process takes place by means of a rotor-stator apparatus for the mixing of liquids (hereinafter also rotor-stator mixer).

Rotor-stator mixers are familiar to the person skilled in the art and in principle comprise all of the types of dynamic mixer where a high-speed, preferably rotationally symmetrical, rotor interacts with a stator to form one or more operating regions which in essence have the shape of an annular gap. Within said operating regions, the material to be mixed is subjected to severe shear stresses, and high levels of turbulence often prevail in these annular gaps, and likewise promote the mixing process. The rotor-stator apparatus is operated at a relatively high rotational rate, generally from 1,000 to 20,000 rpm. This gives high peripheral velocities and a high shear rate, thus subjecting the emulsion to severe shear stresses, which lead to effective comminution of the melt and thus to very effective emulsification.

Among the rotor-stator mixers are, by way of example, toothed-ring dispersers, annular-gap mills, and colloid mills.

Preference is given to those rotor-stator mixers which have means of generating cavitation forces. Means of this type can be elevations arranged on the rotor side and/or on the stator side, where these protrude into the mixing chamber and which have at least one area where the normal has a tangential fraction, examples being pins, teeth, or knives or coaxial rings with radially arranged slots.

The rotor-stator mixer preferably has, on the side of the rotor, at least one toothed ring arranged so as to be rotationally symmetrical, and/or at least one ring which has radial slots (tooth gaps) arranged so as to be rotationally symmetrical. Apparatuses of this type are also termed toothed-ring dispersers or toothed-ring dispersing machines. In particular, the rotor-stator mixer has, on the side of the rotor and also on the side of the stator, at least one toothed ring arranged so as to be rotationally symmetrical, and/or at least one ring with radial slots (tooth gaps), where the (toothed) rings on the side of the rotor and on the side of the stator are arranged coaxially and undergo mutual intermeshing to form an annular gap.

In one particularly preferred embodiment, the rotor-stator mixer is a toothed-ring dispersing machine which has a conical stator with a concentric frustoconical recess, and which has a likewise concentric conical rotor, where the rotor protrudes into the frustoconical operating chamber of the stator in such a way as to form an annular operating chamber, into which teeth protrude on the side of the rotor and of the stator, and these are respectively arranged in the form of one or more, e.g. 2, 3, or 4 coaxial toothed rings on the side of the rotor and of one or more, e.g. 1, 2, 3, or 4 coaxial toothed rings on the side of the stator, in such a way that the toothed rings undergo mutual offset intermeshing.

Apparatuses of this type are known to the person skilled in the art by way of example from DE 10024813 A1 and US 2002/076639, and are supplied by way of example by Cavitron Verfahrenstechnik v. Hagen & Funke GmbH, Spröckhovel, Germany.

The width b of the operating chamber in the toothed-ring dispersing machines of this preferred embodiment is generally about equal to the tooth height. The stator teeth and the rotor teeth typically have rounded-off corners, and specifically not only at the upper ends of the tooth but also at the concave corners at the base of the tooth. The teeth have generally been finely polished and usually have an extremely smooth surface. Their design is typically mutually complementary, so that when teeth are aligned, the result is an undulating gap between the teeth, the width of the gap being approximately equal at all positions. The stator and the rotor are generally respectively single-piece components, i.e. the stator and rotor teeth have been molded onto the component internally to give a single piece. This means that no separate rings of teeth are present, and also therefore means that no foreign substances can settle thereunder, or within interstices. The rotor has usually been secured by securing means, typically using screw threads, to a rotor support, which has been attached in rotationally fixed manner to the shaft. There is generally a securing means, for example a screw thread, pressing the rotor onto the rotor support and pressing this onto a shaft casing, which typically surrounds a shaft and has axial bracing against the shaft. The unit made of rotor support and rotor can be removed from the shaft by releasing the securing means.

Surrounding rotor and stator there is a housing, which has inlets for the polymer melt and the aqueous dispersion medium, and outlets for the dispersion. In one particular embodiment, that rear side of the housing that faces away from the inlet has been sealed by a rear wall, which has a passage for a shaft, and which typically bulges into an intermediate space. The passage for the shaft, or the passage for the shaft casing, has been sealed by a gasket arrangement, which preferably has an axial face seal with a fixed ring and a ring that rotates with the system. In one specific embodiment, the rear wall of the housing delimits an annular rear space which has been formed behind the rotor support and which is part of the housing.

The operating chamber between stator and rotor preferably has external radial delimitation via a perforated wall of the stator. Typically, the perforated wall comprises numerous radially arranged holes. It preferably has a further surrounding perforated wall, which is a constituent of a ring secured on the rotor support. After passage of the teeth, when the rotor is rotated, the holes of the perforated walls of rotor and stator alternately coincide and narrow, time-limited jets of the liquid are thus forced into an annular space, which surrounds the rotor, and which has connection to the optionally present rear space.

If the rear space is present, its width between rotor support and the rear wall of the housing is preferably substantially greater than the width b of the operating chamber. The smallest width is found at the external periphery of the rear space, and the greatest width is found in the region near to the shaft. The securing means, which also secure the ring to the rotor support, preferably form, with their heads, pump vanes which can convey the liquid comprised within the rear space and can force it onward. Since the rate of rotation of the rotor in the operating condition is relatively high, generally from 1,000 to 20,000 rpm, the result is not only a high shear rate but also a high level of centrifugal action, and the liquid is thus forced outward and fed to the outlet.

In the invention, the composition of the polymer is mixed with the aqueous dispersion medium at a temperature above the softening point of the polymer. For this, the material is usually heated to a temperature above the softening point and introduced, preferably continuously, into the mixing apparatus. The required amount of aqueous dispersion medium is similarly, preferably continuously, introduced into the mixing apparatus. The amount of dispersion medium selected here is generally such as to set the desired solids content of the dispersion. However, it is also possible to use a larger amount of the dispersion medium and then to concentrate the resultant dispersion. It is equally possible to begin by producing a more concentrated dispersion and to dilute this with further dispersion medium and/or water. The mass ratio of polymer introduced to the total amount of aqueous dispersion medium is typically in the range from 1:20 to 1.2:1, frequently in the range from 1:10 to 1:1.1, and in particular in the range from 1:3 to 1:1. In the case of continuous addition of polymer and of aqueous dispersion medium, the mass ratio of the streams of materials introduced is within the abovementioned ranges. In the case of multistage addition of dispersion medium, the mass ratio of polymer introduced to the total amount of aqueous dispersion medium introduced in the first to penultimate stage can also be up to 4:1 or up to 2.3:1. It is preferable that the introduction of polymer and of aqueous dispersion medium takes place at a constant addition rate, i.e. that the mass ratio of thermoplastic polymer and dispersion medium is constant during the process, or does not deviate by more than 10% from the preselected mass ratio.

The introduction of the thermoplastic polymer into the aqueous dispersion medium typically takes place at a temperature which is at least 5 K, frequently at least 10 K, and in particular at least 20 K, e.g. within the range from 5 to 150 K, frequently in the range from 10 to 100 K, and in particular in the range from 20 to 80 K, above the melting or softening point of the polymer. This temperature is also termed mixing temperature hereinafter. The introduction of the polymer into the aqueous dispersion medium generally takes place at a temperature of at most 300° C., e.g. in the range from 50 to 300° C., frequently from 60 to 250° C., and in particular from 100 to 200° C.

By virtue of the comparatively high mixing temperature, the introduction of the melt into the aqueous dispersion medium usually takes place at a pressure above atmospheric pressure, and generally at a pressure in the range from 1 to 50 bar, frequently from 1.1 to 40 bar, in particular in the range from 1.5 to 20 bar.

The mixing process can be carried out in one or more stages, e.g. 2, 3, 4, or 5, where at least one stage is carried out in a rotor-stator mixer. In the case of a multistage process, it is preferable that all of the stages are carried out in rotor-stator mixers.

In one first embodiment of the invention, the mixing takes place in one stage, i.e. the mixing apparatus comprises a rotor-stator mixer. In this process, the amounts of polymer and dispersion medium required to produce the dispersion are generally introduced into the rotor-stator mixer. A method that has proven successful for this heats the dispersion medium, prior to introduction, to the desired mixing temperature or a temperature of at least 20 K below the mixing temperature, and preferably to a temperature in the range mixing temperature +/−20 K.

In a second, preferred embodiment of the invention, the mixing takes place in a plurality of stages, i.e. in a mixing apparatus which has a plurality of, e.g. 2, 3, 4, or 5, in particular 3 or 4, rotor-stator mixers connected to one another in series. In a method which has proven successful here, the thermoplastic polymer and a portion of the dispersion medium are added to the first stage, i.e. to the first rotor-stator mixer, where they are mixed at a temperature above the melting or softening point of the polymer, using the portion of the aqueous dispersion medium. The portion of the dispersion medium added to the first stage here is usually from 10 to 60% by weight, in particular from 15 to 40% by weight, based on the total amount of the dispersion medium introduced into the mixing apparatus. The introduction of the thermoplastic polymer into the portion of the aqueous dispersion medium typically takes place here at a temperature which is at least 5 K, frequently at least 10 K, and in particular at least 20 K, e.g. in the range from 5 to 150 K, frequently in the range from 10 to 100 K, and in particular in the range from 20 to 80 K, above the melting or softening point of the polymer. The mixing temperature in the first rotor-stator mixer is generally at most 300° C., being by way of example in the range from 50 to 300° C., frequently from 80 to 250° C., and in particular from 100 to 200° C. In a method which has proven successful for this, the portion of dispersion medium introduced into the first rotor-stator mixer is heated, prior to introduction, to the desired mixing temperature or to a temperature which is at least 20 K below the mixing temperature, preferably to a temperature in the range mixing temperature +/−20 K. The aqueous dispersion produced in the first rotor-stator mixer is then transferred to a further rotor-stator mixer, where it is mixed with a further portion, or with the remaining portion, of the dispersion medium. There can be, for example, 1 or 2 further rotor-stator mixers following the second rotor-stator mixer, and the dispersion produced in the second rotor-stator mixer is mixed in the optional further rotor-stator mixer(s), e.g. in the third rotor-stator mixer, with the remaining amount, or with a further portion, of the aqueous dispersion medium. The temperature at which the dispersion produced in the first rotor-stator mixer is mixed with further dispersion medium in the second rotor-stator mixer can be the same as the temperature in the first rotor-stator mixer, or higher or lower. It is preferably below the temperature in the first rotor-stator mixer. In a method which has proven particularly successful, the mixing temperature in the first of the rotor-stator mixers connected to one another in series is at least 20 K, preferably at least 30 K, e.g. from 20 to 200 K, in particular from 30 to 120 K, above the temperature in the last of the rotor-stator mixers connected to one another in series. In particular, the temperature in the last of the rotor-stator mixers connected to one another in series is at least 5 K, in particular at least 10 K, e.g. from 5 to 200 K, in particular from 10 to 150 K, below the melting or softening point of the thermoplastic polymer.

In one preferred embodiment of the invention, the thermoplastic polymer and the aqueous dispersion medium which comprises the at least one surfactant substance are simultaneously introduced, preferably continuously, and in particular at a constant rate by volume, into the rotor-stator mixer(s), and the dispersion is removed in similar fashion.

However, it is also possible, in a preceding step, to mix the thermoplastic polymer with the aqueous dispersion medium which comprises the at least one surfactant substance, thus obtaining a primary emulsion, at a temperature above the melting or softening point of the polymer, and to introduce this mixture to the rotor-stator mixer. Said preceding step is preferably carried out in a kneader or extruder. The resultant pre-emulsion is then introduced into the rotor-stator mixer(s). It is preferable that the pre-emulsion is kept at a temperature above the melting or softening point of the polymer.

The aqueous emulsion which is initially obtained and which is produced in the mixing apparatus, and which comprises the polymer in the aqueous dispersion medium, is then, i.e. after discharge from the mixing apparatus, quenched, i.e. rapidly cooled to a temperature below the softening point of the polymer, in order to avoid agglomeration of the polymer particles in the emulsion. The quenching process can be undertaken in a manner which is conventional per se, for example by using suitable cooling apparatuses and/or via dilution with cooled dispersion medium. The residence time of the emulsion at temperatures above the melting or softening point of the polymer, after discharge from the mixing apparatus, should preferably be no longer than 20 s, in particular no longer than 10 s. In the case of a mixing apparatus which has a plurality of rotor-stator mixers connected to one another in series, the quenching process can also take place in the $2^{nd}$ and the optional further rotor-stator mixers.

In the invention, the aqueous dispersion medium comprises, alongside water, at least one surfactant substance. Among these are polymeric surfactant substances with molecular weights above 2,000 daltons (number average), e.g. from 2,200 to $10^6$ daltons, these generally being termed protective colloids, and low-molecular-weight surfactant substances with molecular weights up to 2,000 daltons, frequently up to 1,500 daltons (number average), these generally being termed emulsifiers. The surfactant substances can be cationic, anionic, or neutral.

In one preferred embodiment of the invention, the aqueous dispersion medium comprises at least one protective colloid, for example a neutral, anionic, or cationic protective colloid, optionally in combination with one or more emulsifiers.

Examples of protective colloids are water-soluble polymers, e.g.

neutral protective colloids: e.g. polysaccharides, for example water-soluble starches, starch derivatives, and cellulose derivatives, such as methylcellulose, hydroxypropylcellulose, hydroxyethylcellulose, hydroxypropylmethylcellulose, and also polyvinyl alcohols, inclusive of partially hydrolyzed polyvinyl acetate with a degree of hydrolysis which is preferably at least 40%, in particular at least 60%, polyacrylamide, polyvinylpyrrolidone, polyethylene glycols, graft polymers of vinyl acetate and/or vinyl propionate onto polyethylene glycols, and polyethylene glycols mono- or bilaterally end-group-capped with alkyl, carboxy, or amino groups;

anionic water-soluble polymers, the main polymer chain of which has a plurality of carboxy groups, sulfonic acid groups, sulfonate groups, and/or phosphonic acid groups or phosphonate groups, e.g. carboxymethylcellulose, homo- and copolymers of ethylenically unsaturated monomers which comprise at least 20% by weight, based on the total amount of the monomers, of at least one ethylenically unsaturated monomer which comprises at least one carboxy group, sulfonic acid group, and/or phosphonic acid group incorporated within the polymer, and salts of these, in particular the alkali metal salts and ammonium salts. When the abovementioned anionic water-soluble polymers are in an aqueous medium, the sulfonic acid groups bonded to the main polymer chain are generally in the salt form, i.e. in the form of sulfonate groups, the phosphonic acid groups correspondingly being in the form of phosphonate groups. The counterions are then typically alkali metal ions and alkaline earth metal ions, examples being sodium ions, and calcium ions, and ammonium ions ($NH_4^+$);

cationic polymers, e.g. polydiallyldimethylammonium salts, e.g. the chlorides;

anionically or cationically modified starches; examples of anionically modified starches are carboxymethylated starches and n-octenylsuccinyl-modified starch, examples of these being obtainable in the form of products from Cargill (CEmCap/CEmTex/CDeliTex n-octenylsuccinylated starches); examples of cationically modified starches are starches modified with 2-hydroxy-3-(trimethylammonium)propyl groups, examples being starches which are obtainable by reacting conventional starches with N-(3-chloro-2-hydroxypropyl)trimethylammonium chloride (CHPTAC), and which preferably have a degree of substitution of from 0.02 to 0.1. The products Hi-Cat 21370 from Roquette and Perlcore 134P from Lyckeby are examples of these.

Examples of the anionic water-soluble polymers of which the main chain has a plurality of carboxy groups, sulfonic acid groups or sulfonate groups, and/or phosphonic acid groups or phosphonate groups, are:

homo- and copolymers of monoethylenically unsaturated monocarboxylic acids having from 3 to 6 carbon atoms (hereinafter monoethylenically unsaturated $C_3$-$C_6$ monocarboxylic acids), examples being acrylic acid and methacrylic acid, and salts thereof, in particular the alkali metal salts and ammonium salts; copolymers of monoethylenically unsaturated $C_3$-$C_6$ monocarboxylic acids with neutral monomers, e.g. vinylaromatics, such as styrene, $C_1$-$C_{10}$-alkyl esters of monoethylenically unsaturated $C_3$-$C_6$ monocarboxylic acids, and/or $C_4$-$C_6$ dicarboxylic acids, examples being methyl acrylate, methyl methacrylate, ethyl acrylate, ethyl methacrylate, propyl acrylate, propyl methacrylate, n-butyl acrylate, n-butyl methacrylate, tert-butyl acrylate, tert-butyl methacrylate, n-hexyl acrylate, n-hexyl methacrylate, hydroxyethyl esters, and in particular hydroxyethyl and hydroxypropyl esters of the abovementioned monoethylenically unsaturated $C_3$-$C_6$ monocarboxylic acids and/or $C_4$-$C_6$ dicarboxylic acids, examples being hydroxyethyl acrylate, hydroxyethyl methacrylate, hydroxypropyl acrylate and hydroxypropyl methacrylate, and also vinyl esters of aliphatic carboxylic acids, examples being vinyl acetate and vinyl propionate;

homo- and copolymers of monoethylenically unsaturated sulfonic acids, e.g. vinylsulfonic acid, styrenesulfonic acid, 2-acrylamido-2-methylpropanesulfonic acid, 2-acryloxyethanesulfonic acid, 2-acryloxypropanesulfonic acid, etc., and also copolymers thereof with the abovementioned neutral monomers, and also the salts of the abovementioned homo- and copolymers, in particular the alkali metal salts and ammonium salts;

homo- and copolymers of monoethylenically unsaturated phosphonic acids, e.g. vinylphosphonic acid, 2-acrylamido-2-methylpropanephosphonic acid, 2-acryloxyethanephosphonic acid, 2-acryloxypropanephosphonic acid, etc., and also copolymers thereof with the abovementioned neutral monomers, and also the salts of the abovementioned homo- and copolymers, in particular the alkali metal salts and ammonium salts;

where the proportion of the neutral comonomers in the abovementioned copolymers generally will not exceed a proportion of 80% by weight, in particular 70% by weight, based on the total amount of the monomers constituting the copolymer.

Particular anionic water-soluble polymers, the main chain of which has a plurality of sulfonate groups, are also water-soluble copolyesters which have an amount of from 0.3 to 1.5 mmol/g of polyester, in particular from 0.5 to 1.0 mmol/g of polyester, of aromatically bonded sulfonic acid groups and, respectively, sulfonate groups, and salts of these, in particular the alkali metal salts and ammonium salts thereof, where the water-soluble copolyesters are preferably composed of:
  i) from 6 to 30 mol %, based on the total amount of components i), ii), and iii), of at least one aromatic dicarboxylic acid which has at least one sulfonate group and which is preferably selected from 5-sulfoisophthalic acid or from salts thereof, in particular the sodium salt of sulfoisophthalic acid, or ester-forming derivatives thereof;
  ii) optionally one or more aromatic dicarboxylic acids which have no sulfonyl groups and which are preferably selected from terephthalic acid and isophthalic acid and mixtures thereof, or ester-forming derivatives thereof;
  iii) optionally one or more aliphatic or cycloaliphatic dicarboxylic acids, or ester-forming derivatives thereof;
  iv) from 95 to 105 mol %, based on the total amount of components i), ii), and iii), of one or more aliphatic diols, e.g. ethylene glycol, 1,2-propanediol, 1,3-propanediol, 1,2-butanediol, 1,4-butanediol, 1,5-pentanediol, 2,4-dimethyl-2-ethylhexane-1,3-diol, 2,2-dimethyl-1,3-propanediol, 2-ethyl-2-butyl-1,3-propanediol, 2-ethyl-2-isobutyl-1,3-propanediol, 2,2,4-trimethyl-1,6-hexanediol, in particular ethylene glycol, 1,3-propanediol, 1,4-butanediol or 2,2-dimethyl-1,3-propanediol (neopentyl glycol),
  where the total amount of components ii) and iii) makes up from 70 to 94 mol %, based on the total amount of components i), ii) and iii), where components i), ii), iii), and iv) generally make up at least 99% by weight of all of the ester-forming constituents of the polyester (based on the components comprised within the polyester). Water-soluble copolyesters of this type are known by way of example from U.S. Pat. No. 6,521,679, the disclosure of which is hereby in its entirety incorporated herein by way of reference.

Examples of familiar nonionic emulsifiers are $C_2$-$C_3$-alkoxylated, in particular ethoxylated, mono-, di-, and tri-alkylphenols (degree of ethoxylation from 3 to 50, alkyl radical: $C_4$ to $C_{12}$), and also $C_2$-$C_3$-alkoxylated, in particular ethoxylated, fatty alcohols (degree of ethoxylation from 3 to 80; alkyl radical: $C_8$ to $C_{36}$). Examples of these are the Lutensol® A grades ($C_{12}$ to $C_{14}$ fatty alcohol ethoxylates, degree of ethoxylation from 3 to 8), Lutensol® AO grades ($C_{13}$ to $C_{15}$ oxo alcohol ethoxylates, degree of ethoxylation from 3 to 30), Lutensol® AT grades ($C_{16}$ to $C_{18}$ fatty alcohol ethoxylates, degree of ethoxylation from 11 to 80), Lutensol® ON grades (C10 oxo alcohol ethoxylates, degree of ethoxylation from 3 to 11), and the Lutensol® TO grades (C13 oxo alcohol ethoxylates, degree of ethoxylation from 3 to 20), from BASF SE.

Conventional anionic emulsifiers are the salts of amphiphilic substances which have an anionic functional group, such as a sulfonate, phosphonate, sulfate, or phosphate group. Examples of these are the salts, in particular the alkali metal salts and ammonium salts, of alkyl sulfates (alkyl radical: C8 to C12), the salts, in particular the alkali metal salts and ammonium salts, of amphiphilic compounds which have a sulfated or phosphated oligo-$C_2$-$C_3$-alkylene oxide group, in particular a sulfated or phosphated oligoethylene oxide group, examples being the salts, in particular the alkali metal salts and ammonium salts, of sulfuric acid hemiesters of ethoxylated alkanols (degree of ethoxylation from 2 to 50, in particular from 4 to 30, alkyl radical: $C_{10}$ to $C_{30}$, in particular $C_{12}$ to $C_{18}$), the salts, in particular the alkali metal salts and ammonium salts, of sulfuric acid hemiesters of ethoxylated alkylphenols (degree of ethoxylation from 2 to 50, alkyl radical: $C_4$ to $C_{12}$), the salts, in particular the alkali metal salts and ammonium salts, of phosphoric acid hemiesters of ethoxylated alkanols (degree of ethoxylation from 2 to 50, in particular from 4 to 30, alkyl radical: $C_{10}$ to $C_{30}$, in particular $C_{12}$ to $C_{18}$), the salts, in particular the alkali metal salts and ammonium salts, of phosphoric acid hemiesters of ethoxylated alkylphenols (degree of ethoxylation from 2 to 50, alkyl radical: $C_4$ to $C_{12}$), the salts, in particular the alkali metal salts and ammonium salts, of alkylsulfonic acids (alkyl radical: $C_{12}$ to $C_{18}$), the salts, in particular the alkali metal salts and ammonium salts, of alkylarylsulfonic acids (alkyl radical: $C_9$ to $C_{18}$), and also the salts, in particular the alkali metal salts and ammonium salts, of alkylbiphenyl ether sulfonic acids (alkyl radical: $C_6$ to $C_{18}$), an example being the product marketed as Dowfax® 2A1.

Suitable cationic emulsifiers are generally cationic salts having a $C_6$-$C_{18}$-alkyl, $C_1$-$C_{10}$-alkylaryl, or heterocyclic radical, examples being primary, secondary, tertiary, and quaternary ammonium salts, alkanolammonium salts, pyridinium salts, imidazolinium salts, oxazolinium salts, morpholinium salts, thiazolinium salts, and also salts of amine oxides, quinolinium salts, isoquinolinium salts, tropylium salts, sulfonium salts, and phosphonium salts, in particular the appropriate sulfates, methosulfates, acetates, chlorides, bromides, phosphates, and hexafluorophosphates, and the like. Examples that may be mentioned are dodecylammonium acetate or the corresponding sulfate, the sulfates or acetates of the various paraffinic esters which involve the 2-(N,N,N-trimethylammonium)ethyl radical, N-cetylpyridinium sulfate, N-laurylpyridinium sulfate, and also N-cetyl-N,N,N-trimethylammonium sulfate, N-dodecyl-N,N,N-trimethylammonium sulfate, N-octyl-N,N,N-trimethylammonium sulfate, N,N-distearyl-N,N-dimethylammonium sulfate, and also the Gemini surfactant N,N'-(lauryldimethyl)-ethylenediamine disulfate, ethoxylated tallow fatty alkyl-N-methylammonium sulfate, and ethoxylated oleylamine (for example Uniperol® AC from BASF Aktiengesellschaft, about 12 ethylene oxide units).

In one preferred embodiment of the invention, the aqueous dispersion medium comprises at least one neutral protective colloid, in particular one neutral, protective colloid bearing OH groups, optionally in combination with one or more emulsifiers, preferably anionic or nonionic emulsifiers, in particular anionic emulsifiers which bear a sulfate or sulfonate group. Examples of neutral protective colloids bearing OH groups are polysaccharides, e.g. water-soluble starches, starch derivatives, and cellulose derivatives, such as methylcellulose, hydroxypropylcellulose, hydroxyethylcellulose, hydroxypropylmethylcellulose, carboxymethylcellulose, and also polyvinyl alcohols, inclusive of partially hydrolyzed polyvinyl acetate having a degree of hydrolysis which is preferably at least 40%, in particular at least 60%. In particular, the neutral protective colloid bearing OH groups has been selected from polyvinyl alcohols, inclusive of partially hydrolyzed polyvinyl acetates having a degree of hydrolysis which is preferably at least 40%, in particular at least 60%.

In another preferred embodiment of the invention, the aqueous dispersion medium comprises at least one anionic protective colloid, optionally in combination with one or more nonionic protective colloids and/or one or more emulsifiers, preferably one or more nonionic and/or one anionic emulsifier(s). Suitable anionic protective colloids are the abovementioned anionic water-soluble polymers, the main polymer chain of which has a plurality of carboxy groups, sulfonic acid groups, or sulfonate groups, and/or phosphonic acid groups or phosphonate groups, and salts thereof, in particular the alkali metal salts and ammonium salts thereof. Among these, in particular preference is given to:

homo- and copolymers of monoethylenically unsaturated $C_3$-$C_6$ monocarboxylic acids, e.g. acrylic acid or methacrylic acid, and salts thereof, in particular the alkali metal salts and ammonium salts;

salts, in particular alkali metal salts and ammonium salts, of copolymers of monoethylenically unsaturated $C_3$-$C_6$ monocarboxylic acids with neutral monomers, e.g. vinylaromatics, such as styrene, $C_1$-$C_{10}$ alkyl esters of monoethylenically unsaturated $C_3$-$C_6$ monocarboxylic acids and/or $C_4$-$C_6$ dicarboxylic acids, e.g. methyl acrylate, methyl methacrylate, ethyl acrylate, ethyl methacrylate, propyl acrylate, propyl methacrylate, n-butyl acrylate, n-butyl methacrylate, tert-butyl acrylate, tert-butyl methacrylate, n-hexyl acrylate, n-hexyl methacrylate, hydroxyethyl esters, in particular hydroxyethyl and hydroxypropyl esters of the abovementioned monoethylenically unsaturated $C_3$-$C_6$ monocarboxylic acids and/or $C_4$-$C_6$ dicarboxylic acids, e.g. hydroxyethyl acrylate, hydroxyethyl methacrylate, hydroxypropyl acrylate, and hydroxypropyl methacrylate, and also vinyl esters of aliphatic carboxylic acids, e.g. vinyl acetate and vinyl propionate, where the proportion of the neutral comonomers in the abovementioned comonomers will not generally exceed a proportion of 80% by weight, in particular 70% by weight, based on the total amount of the monomers constituting the copolymer, and also the salts of the abovementioned copolymers, in particular the alkali metal salts and ammonium salts;

homo- and copolymers of monoethylenically unsaturated sulfonic acids, e.g. vinylsulfonic acid, styrenesulfonic acid, 2-acrylamido-2-methylpropanesulfonic acid, 2-acryloxyethanesulfonic acid, 2-acryloxypropanesulfonic acid, etc., and also copolymers thereof with the abovementioned neutral monomers, and also the salts of the abovementioned homo- and copolymers, in particular the alkali metal salts and ammonium salts;

anionically modified starches;

water-soluble copolyesters which have an amount of from 0.3 to 1.5 mmol/g of polyester, in particular from 0.5 to 1.0 mmol/g of polyester, of aromatically bonded sulfonic acid groups and, respectively, sulfonate groups, and salts thereof, in particular the alkali metal salts and ammonium salts thereof, where the water-soluble copolyesters are preferably composed of:

i) from 6 to 30 mol %, based on the total amount of components i), ii), and iii), of at least one aromatic dicarboxylic acid which has at least one sulfonate group, and which is preferably selected from 5-sulfoisophthalic acid or from salts thereof, in particular the sodium salt of sulfoisophthalic acid, or ester-forming derivatives thereof;

ii) optionally one or more aromatic dicarboxylic acid(s) which has/have no sulfonyl groups, and which is/are preferably selected from terephthalic acid and isophthalic acid and mixtures thereof, or ester-forming derivatives thereof; iii) optionally one or more aliphatic or cycloaliphatic dicarboxylic acids, or ester-forming derivatives thereof;

iv) from 95 to 105 mol %, based on the total amount of components i), ii), and iii), of one or more aliphatic diols, e.g. ethylene glycol, 1,2-propanediol, 1,3-propanediol, 1,2-butanediol, 1,4-butanediol, 1,5-pentanediol, 2,4-dimethyl-2-ethylhexane-1,3-diol, 2,2-dimethyl-1,3-propanediol, 2-ethyl-2-butyl-1,3-propanediol, 2-ethyl-2-isobutyl-1,3-propanediol, 2,2,4-trimethyl-1,6-hexanediol, in particular ethylene glycol, 1,3-propanediol, 1,4-butanediol or 2,2-dimethyl-1,3-propanediol (neopentyl glycol), where the total amount of components ii) and iii) makes up from 70 to 94 mol %, based on the total amount of components i), ii) and iii), where components i), ii), iii), and iv) generally make up at least 99% by weight of all of the ester-forming constituents of the polyester (based on the components comprised within the polyester). Water-soluble copolyesters of this type are known by way of example from U.S. Pat. No. 6,521,679, the disclosure of which is hereby incorporated herein by way of reference.

Particularly preferred anionic protective colloids are those which have sulfonic acid groups and, respectively, sulfonate groups in the main polymer chain, in particular the abovementioned water-soluble copolyesters and salts thereof.

In a third, equally preferred, embodiment of the invention, the surfactant substance comprised within the aqueous dispersion medium comprises at least one anionic emulsifier which comprises a sulfated or a phosphated oligo-$C_2$-$C_3$-alkylene oxide group, in particular a sulfated or a phosphated oligoethylene oxide group, preferably in the form of an alkali metal salt or ammonium salt. In said emulsifiers, the oligo- $C_2$-$C_3$-alkylene oxide group preferably has from 2 to 50, in particular from 4 to 30, $C_2$-$C_3$-alkylene oxide repeat units (number average) and it is preferable here that at least 50% of, and in particular all of, the $C_2$-$C_3$-alkylene oxide repeat units derive from ethylene oxide. Among these are by way of example the salts, in particular the alkali metal salts and ammonium salts of sulfuric acid hemiesters of ethoxylated alkanols (degree of ethoxylation from 2 to 50, in particular from 4 to 30, alkyl radical: $C_{10}$ to $C_{30}$, in particular $C_{12}$ to $C_{18}$), the salts, in particular the alkali metal salts and ammonium salts, of sulfuric acid hemiesters of ethoxylated alkylphenols (degree of ethoxylation from 2 to 50, alkyl radical: $C_4$ to $C_{12}$), the salts, in particular the alkali metal salts and ammonium salts, of phosphoric acid hemiesters of ethoxylated alkanols (degree of ethoxylation from 2 to 50, in particular from 4 to 30, alkyl radical: $C_{10}$ to $C_{30}$, in particular $C_{12}$ to $C_{18}$), the salts, in particular the alkali metal salts and ammonium salts, of phosphoric acid hemiesters of ethoxylated alkylphenols (degree of ethoxylation from 2 to 50, alkyl radical: $C_4$ to $C_{12}$). Among these, particular preference is given to those emulsifiers which have a sulfated oligo-$C_2$-$C_4$-alkylene oxide group, and specifically a sulfated oligoethylene oxide group, preferably taking the form of an alkali metal salt or ammonium salt.

Among these, particular preference is given to the salts, in particular the alkali metal salts and ammonium salts, of sulfuric acid hemiesters of ethoxylated alkanols, where these have a degree of ethoxylation of from 2 to 50, in particular from 4 to 30, and where the alkyl radical underlying the alkanol is linear or branched and has from 10 to 30, and in particular from 12 to 18, carbon atoms.

In said third, likewise preferred, embodiment of the invention, the surfactant substance comprised within the aqueous dispersion medium is preferably at least one anionic emulsifier which has a sulfated or a phosphated oligo-$C_2$-$C_3$-alkylene oxide group, in particular a sulfated or a phosphated oligoethylene oxide group, or is a combination of at least one such anionic emulsifier with one or more nonionic emulsifiers, or is a combination of at least one such anionic emulsifier with an anionic emulsifier that differs therefrom, optionally in combination with one or more nonionic emulsifiers, or is a combination of at least one such anionic emulsifier with one or more nonionic protective colloids, in particular with at least one of the protective colloids that comprise OH groups and that are stated to be preferred, and specifically with a polyvinyl alcohol or with a partially hydrolyzed polyvinyl acetate, or is a combination of at least one such anionic emulsifier with one or more of the abovementioned anionic protective colloids, in particular those having sulfonate groups or having phosphonate groups.

In said third, likewise preferred, embodiment of the invention, the surfactant substance comprised within the aqueous dispersion medium is particularly preferably a combination of at least one anionic emulsifier which has a sulfated or a phosphated oligo-$C_2$-$C_3$-alkylene oxide group, in particular a sulfated or a phosphated oligoethylene oxide group, with one or more nonionic protective colloids, in particular with at least one of the protective colloids which comprise OH groups and which are stated to be preferred, and specifically with a polyvinyl alcohol or with a partially hydrolyzed polyvinyl acetate.

The aqueous dispersion medium generally comprises a concentration of from 0.5 to 20% by weight of the surfactant substance, frequently a concentration of from 1 to 15% by weight, in particular a concentration of from 1 to 10% by weight, based on the aqueous dispersion medium.

The aqueous dispersion medium can comprise, alongside water and the at least one surfactant substance, small amounts of further constituents, examples being antifoams. The proportion of constituents that differ from water and from surfactant substance does not generally exceed 5% by weight, in particular 1% by weight, of the aqueous dispersion medium. It is preferable that the aqueous dispersion medium comprises no, or no significant amounts of, volatile organic solvents. In particular, the content of volatile organic solvents is less than 1% by weight, in particular less than 5,000 ppm, and specifically less than 1,000 ppm. Volatile organic solvents are organic solvents with boiling point below 250° C. at atmospheric, pressure.

The process of the invention can in principle be applied to any of the polymers which have a plurality of ester groups in the main polymer chain. It has proven particularly successful for polymers which, when the methods of the prior art are used, cannot be converted to aqueous dispersions, or can be converted to aqueous dispersions only by using organic solvents or additives which reduce the viscosity of the polymers.

These polymers are firstly defined via high zero-shear viscosity $\eta_0$, which at 180° C. is generally at least 60 Pa·s, frequently at least 80 Pa·s, in particular at least 100 Pa·s, e.g. from 60 to 20,000 Pa·s, in particular from 80 to 15,000 Pa·s, specifically from 100 to 10,000 Pa·s, and via a low acid number: less than 5 mg KOH/g of polymer, in particular at most 3 mg KOH/g of polymer, and specifically at most 1 mg KOH/g of polymer. The acid numbers stated here are the acid number to DIN EN 12634.

The polymers of the invention, moreover, naturally have in essence no functional groups which make the polymers water-soluble. Accordingly, the number of sulfonic acid groups in the polymer is generally less than 0.2 mmol/g, frequently less than 0.1 mmol/g of polymer, in particular less than 0.05 mmol/g of polymer, or less than 0.01 mmol/g of polymer. In one preferred embodiment of the invention, the polymers have from 0.01 to 0.2 mmol/g of sulfonic acid groups, in particular from 0.05 to 1.5 mmol/g. In another embodiment of the invention, the polymers have less than 0.05 mmol/g of sulfonic acid groups, in particular less than 0.01 mmol/g.

The zero-shear viscosity $\eta_0$ at 180° C., also abbreviated hereinafter to $\eta_{10}$ (180° C.), is the limiting value of the dynamic viscosity of the polymer at a shear rate of 0 and at a temperature of 180° C. This value can be determined to DIN 53019-2 from the viscosity curve obtained via dynamic viscosity measurements at 180° C. at various shear rates, by extrapolating the viscosity curve to a shear rate of 0. By way of example, viscosity curves of this type can be determined by means of dynamic viscosity measurement with use of low-amplitude oscillatory shear at shear rates in the range from 0.01 to 500 s$^{-1}$.

The acid number can be determined in a manner known per se via titration of a solution of the polymer in a suitable solvent, such as tetrahydrofuran, pyridine, or toluene, with dilute ethanolic KOH solution (e.g. 0.1 N).

The number-average molecular weight $M_N$ of the polymers used in the process of the invention is typically in the range from 5,000 to 1,000,000 daltons, in particular in the range from 8,000 to 800,000 daltons, and specifically in the range from 10,000 to 500,000 daltons. The weight-average molecular weight $M_W$ of the polymer is generally in the range from 20,000 to 5,000,000 daltons, frequently in the range from 30,000 daltons to 4,000,000 daltons, and in particular in the range from 40,000 to 2,500,000 daltons. The polydispersity index $M_W/M_N$ is generally at least 2, and is frequently in the range from 3 to 20, in particular in the range from 5 to 15. Molecular weight and polydispersity index can by way of example be determined via gel permeation chromatography (GPC) to DIN 55672-1.

The intrinsic viscosity of the polymers, which is an indirect measure of molecular weight, is typically in the range from 50 to 500 ml/g, frequently in the range from 80 to 300 ml/g, and in particular in the range from 100 to 250 ml/g (determined to EN ISO 1628-1 at 25° C. on 0.5% strength by weight solution of the polymer in o-dichlorobenzene/phenol (1:1 w/w)).

Examples of polymers which have a plurality of ester groups and/or carbonate groups in the main chain of the polymer are polyesters, polyesteramides, polyetheresters, polycarbonates, and polyester carbonates. The polymer used in the process of the invention is preferably selected from the group of the polyesters, polyesteramides, and polyetheresters, and mixtures thereof. The polymers are in particular a polyester, a mixture of various polyesters, or a mixture of at least one polyester with a polymer from the group of the polyesteramides and polyetheresters.

The polymers used in the process of the invention can be amorphous or semicrystalline.

In one embodiment of the invention, the polymer is a branched polymer, where the degree of branching preferably does not exceed a value of 1 mol/kg, in particular 0.5 mol/kg, and specifically 0.3 mol/kg. The degree of branching is the number of monomer units condensed into the molecule which have more than 2, e.g. 3, 4, 5, or 6, functional groups suitable for the condensation reaction, where these react with carboxylic acid groups or with hydroxy groups to form bonds, examples being carboxylate, OH, isocyanate (NCO) or $NH_2$ groups (or ester- or amide-forming derivatives thereof). The degree of branching of the polymer in said embodiment is generally from 0.0005 to 1 mol/kg, preferably from 0.001 to 0.5 mol/kg, and in particular from 0.005 to 0.3 mol/kg. Surprisingly, polymers of this type have better dispersion characteristics than those which are unbranched, with a zero-shear viscosity that is per se identical.

In another embodiment of the invention, the polymer is in essence unbranched, i.e. the value of the degree of branching is generally <0.005 mol/kg, in particular <0.001 mol/kg, and specifically <0.0005 mol/kg.

In particular, the polymer is selected from the group of the aliphatic polyesters, aliphatic copolyesters, aliphatic-aromatic copolyesters, and mixtures of these.

An aliphatic polyester is a polyester composed exclusively of aliphatic monomers. An aliphatic copolyester is a polyester composed exclusively of at least two, in particular at least three, aliphatic monomers, where the acid component and/or the alcohol component preferably comprises at least two monomers that differ from one another. An aliphatic-aromatic copolyester is a polyester which is composed of aliphatic monomers but also of aromatic monomers, and it is preferable here that the acid component comprises at least one aliphatic acid and at least one aromatic acid.

The aliphatic polyesters and copolyesters are in particular polylactides, polycaprolactone, block copolymers made of polylactide with poly-$C_2$-$C_4$-alkylene glycol, block copolymers made of polycaprolactone with poly-$C_2$-$C_4$-alkylene glycol, and also the copolyesters defined below which are composed of at least one aliphatic or cycloaliphatic dicarboxylic acid or an ester-forming derivative thereof, and of at least one aliphatic or cycloaliphatic diol component, and also optionally of further components.

The term "polylactides" denotes polycondensates of lactic acid. Suitable polylactides are described in WO 97/41836, WO 96/18591, WO 94/05484, U.S. Pat. Nos. 5,310,865, 5,428,126, 5,440,008, 5,142,023, 5,247,058, 5,247,059, 5,484,881, WO 98/09613, U.S. Pat. Nos. 4,045,418, 4,057,537, and also in Adv. Mater. 2,000, 12, 1841-1846. These products are polymers based on lactide acid lactone (A), which is converted via ring-opening polymerization to polylactic acid polymers (B):

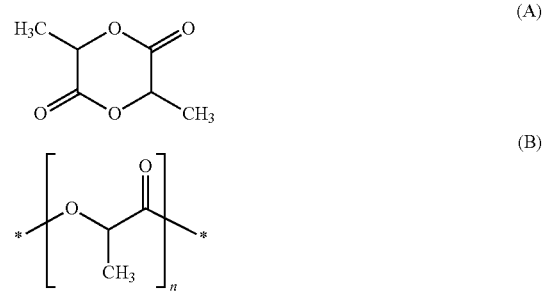

The degree of polymerization n in formula (B) is in the range from 1,000 to 4,000, preferably from 1,500 to 3,500, and particularly preferably from 1,500 to 2,000 (number average). The average molar masses (number average) of these products are, in accordance with the degree of polymerization, in the range from 71,000 to 284,000 g/mol. Suitable polylactides are obtainable by way of example from Cargill Dow LLC (e.g. PLA Polymer 404ID, PLA Polymer 4040D, PLA Polymer 4031D, PLA Polymer 2,000D, or PLA Polymer 1100) from Mitsui Chemicals (Lactea). Other suitable materials are diblock and triblock copolymers of polylactides with poly-$C_2$-$C_4$-alkylene glycol, in particular with poly(ethylene glycol). These block copolymers are marketed by way of example by Aldrich (e.g. product number 659649). These are polymers that have polylactide blocks and poly-$C_2$-$C_4$-alkylene oxide blocks. These block copolymers are obtainable by way of example via condensation of lactic acid or via ring-opening polymerization as lactide (A) in the presence of poly-$C_2$-$C_4$-alkylene glycols.

Other polymers suitable in the invention are polycaprolactones. The person skilled in the art understands these to be polymers described by the formula D indicated below, where n is the number of repeat units in the polymer, i.e. the degree of polymerization.

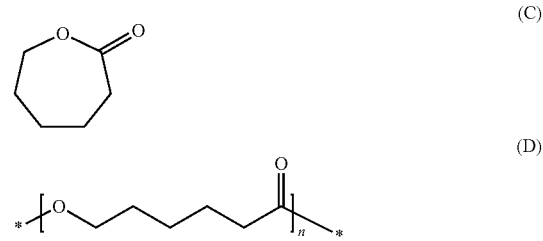

The degree of polymerization n in formula (D) is in the range from 100 to 1,000, preferably from 500 to 1,000 (number average). The number-average molar masses of these products are, in accordance with the degree of polymerization, in the range from 10,000 g/mol to 100,000 g/mol. Particularly preferred polymers of the formula (D) have average molar masses (number average) of 50,000 g/mol (CAPA 6500), 80,000 g/mol (CAPA 6800), and 100,000 g/mol (CAPA FB 100). Polycaprolactones are generally produced via ring-opening polymerization of ε-caprolactone (compound C) in the presence of a catalyst. Polycaprolactones are obtainable commercially from Solvay as CAPA polymers, e.g. CAPA 6100, 6250, 6500 or CAPA FB 100. Other suitable polymers are diblock and triblock copolymers of polycaprolactone with poly-$C_2$-$C_4$-alkylene glycols, in particular with polyethylene glycols (=polyethylene oxides), i.e. polymers which have at least one polycaprolactone block of the formula D and at least one polyalkylene glycol block. These polymers can by way of example be produced via polymerization of caprolactone in the presence of polyalkylene glycols, for example by analogy with the processes described in *Macromolecules* 2003, 36, pp 8825-8829.

Particular polymers that are suitable in the invention are copolyesters, where these are composed of at least one aliphatic or cycloaliphatic dicarboxylic acid or of an ester-forming derivative thereof, and of at least one aliphatic or cycloaliphatic diol component, and also optionally of further components.

In particular, the polymer to be dispersed in the invention is an aliphatic or aliphatic-aromatic copolyester which is in essence composed of:
a) at least one dicarboxylic acid component A, which is composed of
   a1) at least one aliphatic or cycloaliphatic dicarboxylic acid or ester-forming derivatives thereof, or a mixture thereof, and
   a2) optionally one or more aromatic dicarboxylic acids or ester-forming derivatives thereof, or a mixture thereof;
b) at least one diol component B, selected from aliphatic and cycloaliphatic diols and mixtures thereof;
c) optionally one or more further bifunctional compounds C which react with carboxylic acid groups or with hydroxy groups to form bonds; and
d) optionally one or more compounds D which have at least 3 functionalities which react with carboxylic acid groups or with hydroxy groups to form bonds;
where either the compounds a1), a2), B), C), and D) have no sulfonic acid group, or the compounds of groups a1), a2), B), C), and D) comprise, based on the total amount of compounds of component A, up to 3 mol % of a compound which has one or more sulfonic acid groups, e.g. from 0.1 to 3 mol % or from 0.1 to 2 mol % or from 0.2 to 1.5 mol %, where the molar ratio of component A to component B is in the range from 0.4:1 to 1:1, in particular in the range from 0.6:1 to 0.99:1, and components A and B make up at least 80% by weight, in particular at least 90% by weight, and specifically at least 96% by weight, of all of the ester-forming constituents of the polyester and, respectively, of the total weight of the polyester.

Here and hereinafter, the % by weight data referring to the ester-forming constituents are based on the constituents of components A, B, C, and D in the form condensed into the molecule, and are thus based on the total mass of the polyester, and not on the amounts used to produce the polyester, unless otherwise stated.

The acid component A in said copolyesters preferably comprises
a1) from 30 to 100 mol %, in particular from 35 to 90 mol %, or from 40 to 90 mol %, of at least one aliphatic or at least one cycloaliphatic dicarboxylic acid, or ester-forming derivatives thereof, or a mixture thereof,
a2) from 0 to 70 mol %, in particular from 10 to 65 mol %, or from 10 to 60 mol %, of at least one aromatic dicarboxylic acid, or ester-forming derivative thereof, or a mixture thereof,
where the total of the molar percentages of components a1) and a2) is 100%.

In one specific embodiment of the invention, acid component A comprises
a1) from 35 to 90 mol %, or from 40 to 90 mol %, and specifically from 60 to 90 mol %, of at least one aliphatic or at least one cycloaliphatic dicarboxylic acid, or ester-forming derivatives thereof, or a mixture thereof,
a2) from 10 to 65 mol %, or from 10 to 60 mol %, and specifically from 10 to 40 mol %, of at least one aromatic dicarboxylic acid, or ester-forming derivative thereof, or a mixture thereof,
where the total of the molar percentages of components a1) and a2) is 100%.

The acid component A can also comprise, condensed into the molecule, small amounts of a sulfonated carboxylic acid, in particular of a sulfonated aromatic dicarboxylic acid, e.g. sulfoisophthalic acid, or a salt thereof, where the proportion of the sulfonated carboxylic acid generally is not more than 3 mol %, being by way of example in the range from 0.1 to 3 mol %, or from 0.1 to 2 mol %, or from 0.2 to 1.5 mol %, based on the total amount of compounds of component A. In one embodiment of the invention, the amount of sulfonated carboxylic acid is less than 1 mol %, in particular less than 0.5 mol %, based on component A.

In one preferred embodiment of the invention, copolyesters of this type have from 0.01 to 0.2 mmol/g of sulfonic acid groups, in particular from 0.05 to 1.5 mmol/g. In another embodiment of the invention, copolyesters of this type have less than 0.05 mmol/g of sulfonic acid groups, in particular less than 0.01 mmol/g.

Aliphatic dicarboxylic acids a1) which are suitable in the invention generally have from 2 to 10 carbon atoms, preferably from 4 to 8 carbon atoms, and in particular 6 carbon atoms. They can be either linear or branched acids. The cycloaliphatic dicarboxylic acids that can be used for the purposes of the present invention are generally those having from 7 to 10 carbon atoms and in particular those having 8 carbon atoms. However, it is also possible in principle to use dicarboxylic acids having a greater number of carbon atoms, for example up to 30 carbon atoms. Examples that may be mentioned are: malonic acid, succinic acid, glutaric acid, 2-methylglutaric acid, 3-methylglutaric acid, adipic acid, pimelic acid, azelaic acid, sebacic acid, fumaric acid, 2,2-dimethylglutaric acid, suberic acid, 1,3-cyclopentanedicarboxylic acid, 1,4-cyclohexanedicarboxylic acid, 1,3-cyclohexanedicarboxylic acid, diglycolic acid, itaconic acid, maleic acid, and 2,5-norbornanedicarboxylic acid. Ester-forming derivatives of the abovementioned aliphatic or cycloaliphatic dicarboxylic acids which can equally be used and which may be mentioned are in particular the di-$C_1$-$C_6$-alkyl esters, e.g. dimethyl, diethyl, di-n-propyl, diisopropyl, di-n-butyl, diisobutyl, di-t-butyl, di-n-pentyl, diisopentyl, or di-n-hexyl ester. It is equally possible to use anhydrides of the dicarboxylic acids. Preferred dicarboxylic acids are succinic acid, adipic acid, sebacic acid, azelaic acid, and brassylic acid, and also the respective ester-forming derivatives thereof, or a mixture thereof. Particular preference is given to adipic acid, sebacic acid, or succinic acid, and also to the respective ester-forming derivatives thereof, or a mixture thereof.

Aromatic dicarboxylic acids a2 that may be mentioned are generally those having from 8 to 12 carbon atoms and preferably those having 8 carbon atoms. Examples that may be mentioned are terephthalic acid, isophthalic acid, 2,6-naphthoic acid, and 1,5-naphthoic acid, and also ester-forming derivatives thereof. Particular mention may be made here of the di-$C_1$-$C_6$-alkyl esters, e.g. dimethyl, diethyl, diethyl, di-n-propyl, diisopropyl, di-n-butyl, diisobutyl, di-t-butyl, di-n-pentyl, diisopentyl, or di-n-hexyl ester. The anhydrides of the dicarboxylic acids a2 are equally suitable ester-forming derivatives. However, it is also in principle possible to use aromatic dicarboxylic acids a2 having a greater number of carbon atoms, for example up to 20 carbon atoms. The aromatic dicarboxylic acids or ester-forming derivatives thereof a2 can be used individually or in the form of mixture made of two or more thereof. It is particularly preferable to use terephthalic acid or ester-forming derivatives thereof, e.g. dimethyl terephthalate.

Among the aromatic dicarboxylic acids and ester-forming derivatives thereof are especially those which have no sulfonic acid groups. Here and hereinafter these are also termed aromatic dicarboxylic acids a2.1. Among the aromatic sulfonic acids are also sulfonated aromatic dicarboxylic acids and ester-forming derivatives thereof (aromatic dicarboxylic acids a.2.2). These typically derive from the above-mentioned aromatic dicarboxylic acids and bear 1 or 2 sulfonic acid groups. An example that may be mentioned is sulfoisophthalic acid or a salt thereof, e.g. the sodium salt (Na-sip). The content of the sulfonated carboxylic acid generally makes up no more than 3 mol %, based on component A, and by way of example is in the range from 0.1 to 3 mol %, or from 0.1 to 2 mol %, or from 0.2 to 1.5 mol %, based on the total amount of compounds of component A. In one embodiment of the invention, the amount of sulfonated carboxylic acids, based on component A, is less than 1 mol %, in particular less than 0.5 mol %.

The diols B are generally selected from branched or linear alkanediols having from 2 to 12 carbon atoms, preferably from 4 to 8 carbon atoms, or in particular 6 carbon atoms, or from cycloalkanediols having from 5 to 10 carbon atoms.

Examples of suitable alkanediols are ethylene glycol, 1,2-propanediol, 1,3-propanediol, 1,2-butanediol, 1,4-butanediol, 1,5-pentanediol, 2,4-dimethyl-2-ethylhexane-1,3-diol, 2,2-dimethyl-1,3-propanediol, 2-ethyl-2-butyl-1,3-propanediol, 2-ethyl-2-isobutyl-1,3-propanediol, 2,2,4-trimethyl-1,6-hexanediol, in particular ethylene glycol, 1,3-propanediol, 1,4-butanediol or 2,2-dimethyl-1,3-propanediol (neopentyl glycol); cyclopentanediol, 1,4-cyclohexanediol, 1,2-cyclohexanedimethanol, 1,3-cyclohexanedimethanol, 1,4-cyclohexanedimethanol, or 2,2,4,4-tetramethyl-1,3-cyclobutanediol. It is also possible to use mixtures of various alkanediols. Diol component B in said copolyesters is preferably selected from $C_2$-$C_{12}$ alkanediols and mixtures thereof. Preference is given to 1,3-propanediol and in particular to 1,4-butanediol.

Depending on whether an excess of OH end groups is desired, an excess of component B can be used. In one preferred embodiment, the molar ratio of components used A:B can be in the range from 0.4:1 to 1.1:1, preferably in the range from 0.6:1 to 1.05:1, and in particular in the range from 0.7:1 to 1.02:1. The molar ratio of component A incorporated into the polymer to component B incorporated into the polymer is preferably in the range from 0.8:1 to 1.01:1, with preference from 0.9:1 to 1:1, and in particular in the range from 0.99:1 to 1:1.

The polyesters can comprise, condensed into the molecule, not only components A and B but also further bifunctional components C. Said bifunctional compounds have two functional groups which react with carboxylic acid groups or preferably hydroxy groups, to form bonds. Examples of functional groups which react with OH groups are in particular isocyanate groups, epoxy groups, oxazoline groups, carboxy groups in free or esterified form, and amide groups. Particular functional groups which react with carboxy groups are hydroxy groups and primary amino groups. These materials are particularly those known as bifunctional chain extenders, in particular the compounds of groups c3) to c7). Among components C are:

c1) dihydroxy compounds of the formula I

in which A is a $C_2$-$C_4$-alkylene unit, such as 1,2-ethanediyl, 1,2-propanediyl, 1,3-propanediyl, or 1,4-butanediyl, and m is an integer from 2 to 250;

c2) hydroxycarboxylic acids of the formula IIa or IIb

in which p is an integer from 1 to 1,500 and r is an integer from 1 to 4, and G is a radical selected from the group consisting of phenylene, —$(CH_2)_q$—, where q is an integer from 1 to 5, —C(R)H—, and —C(R)HCH$_2$, where R is methyl or ethyl;

c3) amino-$C_2$-$C_{12}$ alkanols, amino-$C_5$-$C_{10}$ cycloalkanols, or a mixture thereof;

c4) diamino-$C_1$-$C_8$ alkanes;

c5) 2,2'-bisoxazolines of the general formula III

where $R_1$ is a single bond, a $(CH_2)_z$-alkylene group, where z=2, 3, or 4, or a phenylene group;

c6) aminocarboxylic acids which by way of example are selected from naturally occurring amino acids, polyamides with a molar mass of at most 18 000 g/mol, obtainable via polycondensation of a dicarboxylic acid having from 4 to 6 carbon atoms and of a diamine having from 4 to 10 carbon atoms, compounds of the formulae IVa and IVb

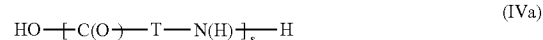

in which s is an integer from 1 to 1,500 and t is an integer from 1 to 4, and T is a radical selected from the group consisting of phenylene, —$(CH_2)_u$—, where u is an integer from 1 to 12, —C($R^2$)H—, and —C($R^2$)HCH$_2$, where $R^2$ is methyl or ethyl, and polyoxazolines having the repeat unit V

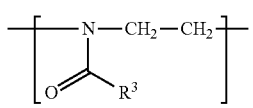

in which $R^3$ is hydrogen, $C_1$-$C_6$-alkyl, $C_5$-$C_8$-cycloalkyl, unsubstituted phenyl or phenyl substituted up to three times with $C_1$-$C_4$-alkyl groups, or is tetrahydrofuryl; and c7) diisocyanates.

Examples of component c1 are diethylene glycol, triethylene glycol, polyethylene glycol, polypropylene glycol, and polytetrahydrofuran (polyTHF), particularly preferably diethylene glycol, triethylene glycol, and polyethylene glycol, and it is also possible here to use mixtures thereof, or compounds which have different alkylene units A (see formula I), e.g. polyethylene glycol which comprises propylene units (A=1,2- or 1,3-propanediyl). The latter are obtainable by way of example via polymerization of first ethylene oxide and then propylene oxide, by methods known per se. Particular preference is given to copolymers based on polyalkylene glycols having various variables A, where units formed from ethylene oxide (A=1,2-ethanediyl) predominate. The molar mass (number average $M_n$) of the polyethylene glycol is generally selected to be in the range from 250 to 8,000 g/mol, preferably from 600 to 3,000 g/mol.

In one of the embodiments it is possible by way of example to use, for the production of the copolyesters, from 80 to 99.8 mol %, preferably from 90 to 99.5 mol %, of the diols B, and from 0.2 to 20 mol %, preferably from 0.5 to 10 mol %, of the dihydroxy compounds c1, based on the molar amount of B and c1.

Examples of preferred components c2 are glycolic acid, D-, L-, or D,L-lactic acid, 6-hydroxyhexanoic acid, cyclic derivatives thereof, e.g. glycolide (1,4-dioxane-2,5-dione), D- or L-dilactide (3,6-dimethyl-1,4-dioxane-2,5-dione), p-hydroxybenzoic acid, and also oligomers thereof, and polymers, such as 3-polyhydroxybutyric acid, polyhydroxyvaleric acid, polylactide (obtainable by way of example in the form of EcoPLA® (Cargill)), or else a mixture of 3-polyhydroxybutyric acid and polyhydroxyvaleric acid (the latter being obtainable as Biopol® from Zeneca). The low-molecular-weight and cyclic derivatives thereof are particularly preferred for producing copolyesters. Examples of amounts that can be used of the hydroxycarboxylic acids or their oligomers and/or polymers are from 0.01 to 20% by weight, preferably from 0.1 to 10% by weight, based on the amount of A and B.

Preferred components c3 are amino-$C_2$-$C_6$ alkanols, such as 2-aminoethanol, 3-aminopropanol, 4-aminobutanol, 5-aminopentanol, 6-aminohexanol, and also amino-$C_5$-$C_6$ cycloalkanols, such as aminocyclopentanol and aminocyclohexanol, or a mixture thereof.

Preferred components c4) are diamino-$C_4$-$C_6$ alkanes, such as 1,4-diaminobutane, 1,5-diaminopentane, and 1,6-diaminohexane.

In one preferred embodiment, the amounts used for producing the copolyesters are from 0.5 to 20 mol %, preferably from 0.5 to 10 mol %, of c3, based on the molar amount of B, and from 0 to 15 mol %, preferably from 0 to 10 mol %, of c4, based on the molar amount of B.

Preferred bisoxazolines III of component c5) are those in which $R^1$ is a single bond, a $(CH_2)_z$-alkylene group, where z=2, 3, or 4, e.g. methylene, ethane-1,2-diyl, propane-1,3-diyl, propane-1,2-diyl, or a phenylene group. Particularly preferred bisoxazolines that may be mentioned are 2,2'-bis(2-oxazoline), bis(2-oxazolinyl)methane, 1,2-bis(2-oxazolinyl) ethane, 1,3-bis(2-oxazolinyl)propane, or 1,4-bis(2-oxazolinyl)butane, 1,4-bis(2-oxazolinyl)benzene, 1,2-bis(2-oxazolinyl)benzene, or 1,3-bis(2-oxazolinyl)benzene. Bisoxazolines of the general formula III are generally obtainable via the process of Angew. Chem. Int. Edit., Vol. 11 (1972), pp. 287-288.

Examples of amounts that can be used for producing the polyesters are from 80 to 98 mol % of B, up to 20 mol % of c3, e.g. from 0.5 to 20 mol % of c3, up to 20 mol % of c4, e.g. from 0.5 to 20 mol %, and up to 20 mol % of c5, e.g. from 0.5 to 20 mol %, based in each case on the total of the molar amounts of components B, c3, c4, and c5. In another preferred embodiment it is possible to use from 0.1 to 5% by weight of c5, preferably from 0.2 to 4% by weight, based on the total weight of A and B.

Component c6 used can comprise naturally occurring aminocarboxylic acids. Among these are valine, leucine, isoleucine, threonine, methionine, phenylalanine, tryptophan, lysine, alanine, arginine, aspartamic acid, cysteine, glutamic acid, glycine, histidine, proline, serine, tryosine, asparagine, and glutamine.

Preferred aminocarboxylic acids of the general formulae IVa and IVb are those in which s is an integer from 1 to 1,000 and t is an integer from 1 to 4, preferably 1 or 2, and T is selected from the group of phenylene and —$(CH_2)_u$—, where u is 1, 5, or 12.

c6 can also moreover be a polyoxazoline of the general formula V. However, component c6 can also be a mixture of various aminocarboxylic acids and/or polyoxazolines.

Amounts of c6 that can be used in one preferred embodiment are from 0.01 to 20% by weight, preferably from 0.1 to 10% by weight, based on the total amount of components A and B.

Component c7 used can comprise aromatic or aliphatic diisocyanates. However, it is also possible to use isocyanates of higher functionality. Examples of aromatic diisocyanates are tolylene 2,4-diisocyanate, tolylene 2,6-diisocyanate, diphenylmethane 2,2'-diisocyanate, diphenylmethane 2,4'-diisocyanate, diphenylmethane 4,4'-diisocyanate, naphthylene 1,5-diisocyanate, and xylylene diisocyanate. Examples of aliphatic diisocyanates are especially linear or branched alkylene diisocyanates or cycloalkylene diisocyanates having from 2 to 20 carbon atoms, preferably having from 3 to 12 carbon atoms, e.g. hexamethylene 1,6-diisocyanate, isophorone diisocyanate, or methylenebis(4-isocyanatocyclohexane). Other components c7 that can be used are tri(4-isocyanatophenyl)methane, and also the cyanurates, uretdiones, and biurets of the abovementioned diisocyanates. Amounts generally used of component c7, if desired, are from 0.01 to 5 mol %, preferably from 0.05 to 4 mol %, particularly preferably from 0.1 to 4 mol %, based on the total of the molar amounts of A and B.

Among other components which can optionally be used for producing the polyesters are compounds D which comprise at least three groups/functionalities which react with carboxylic acid groups or with hydroxy groups, to form bonds. Particular examples of functional groups which react with OH groups are isocyanate groups, epoxy groups, oxazoline groups, carboxy groups in free or esterified form, and amide groups. Particular functional groups which react with carboxy groups are hydroxy groups and primary amino groups. Compounds of this type are also termed crosslinking agents. By using the compound D, it is possible to construct biodegradable copolyesters which are pseudoplastic. The rheology of the melts improves; the biodegradable copolyesters are easier to process, for example easier to draw by melt-solidification processes to give foils. The compounds D have a shear-thinning effect, i.e. viscosity decreases under load. The compounds D preferably comprise from 3 to 10, e.g. 3, 4, 5, or 6, functional groups capable of forming ester bonds. Particularly preferred compounds D have from three to six functional groups of this type in the molecule, in particular from three to six hydroxy groups and/or carboxy groups. Examples that may be mentioned are: polycarboxylic acids and hydroxycarboxylic acids, e.g. tartaric acid, citric acid, malic acid; trimesic acid; trimellitic acid, trimellitic anhydride; pyromellitic acid, pyromellitic dianhydride, and hydroxyisophthalic acid, and also polyols, such as trimethylolpropane and trimethylolethane; pentaerythritol, polyethertriols, and glycerol. Preferred compounds D are polyols, preferably trimethylolpropane, pentaerythritol, and in particular glycerol. The amounts used of the compounds D, insofar as these are desired, are generally from 0.0005 to 1 mol/kg, preferably from 0.001 to 0.5 mol/kg, and in particular from 0.005 to 0.3 mol/kg, based on total amount of components A, B, C, and D, or on the total weight of the polyester. The amounts used of the compounds D, insofar as these are desired, are preferably from 0.01 to 5% by weight, in particular from 0.05 to 3% by weight, and in particular from 0.1 to 2% by weight, and specifically from 0.2 to 2% by weight, based on the total amount of components A, B, C, and D, or on the total weight of the polyester.

It is generally advisable to add the crosslinking (at least trifunctional) compounds D at a relatively early juncture in the polycondensation reaction.

Production of the copolyesters preferred in the invention can also use, alongside the abovementioned components A, B, and optionally C, and optionally D, bi- or polyfunctional epoxides (component E). Particularly suitable bi- or polyfunctional epoxides are copolymers which contain epoxy groups and which are based on styrene, acrylate, and/or methacrylate. The units bearing epoxy groups are preferably glycidyl (meth)acrylates. Copolymers which have proven successful are those having a proportion of greater than 20% by weight, particularly preferably greater than 30% by weight, and with particular preference greater than 50% by weight, of glycidyl methacrylate, based on the copolymer. The epoxy equivalent weight (EEW) in said polymers is preferably from 150 to 3,000 g/equivalent and with particular preference from 200 to 500 g/equivalent. The average molecular weight (weight average) $M_W$ of the polymers is preferably from 2,000 to 25,000, in particular from 3,000 to 8,000. The average molecular weight (number average) $M_n$ of the polymers is preferably from 400 to 6,000, in particular from 1,000 to 4,000. Polydispersity (Q) is generally from 1.5 to 5. Copolymers of the abovementioned type, containing epoxy groups, are marketed by way of example by BASF Resins B.V. with trademark Joncryl® ADR. Joncryl® ADR 4368 is particularly suitable as component E. Component E is usually used as chain extender. In relation to the amount, the information given above for component E, and in particular for components c2), c3), c4), c5), and c6), is applicable.

In particularly preferred copolyesters, acid component A in particular comprises a1) from 60 to 90 mol %, or from 60 to 80 mol %, in particular from 65 to 80 mol %, and specifically from 66 to 75 mol %, of at least one aliphatic or at least one cycloaliphatic dicarboxylic acid, or ester-forming derivatives thereof, or a mixture thereof, a2) from 10 to 40 mol %, or from 20 to 40 mol %, in particular from 20 to 35 mol %, and specifically from 25 to 34 mol %, of at least one aromatic dicarboxylic acid, or ester-forming derivative thereof, or a mixture thereof, where the aromatic dicarboxylic acid is preferably terephthalic acid, and where the molar percentages of components a1) and a2) give a total of 100%. Although particularly preferred copolyesters of this type have comparatively high zero-shear viscosity at 180° C., they feature comparatively good dispersibility.

Among the particularly preferred copolyesters, particular preference is given to those in which the polyester-forming constituents comprise, based on the total weight of the polyester, from 0.1 to 2% by weight, frequently from 0.2 to 2% by weight, in particular from 0.3 to 1.8% by weight, and specifically from 0.4 to 1.5% by weight, of one or more compounds D which have at least 3 functionalities suitable for forming ester groups. In relation to preferred compounds D, the information given above is applicable.

Among the particularly preferred copolyesters, particular preference is given to those in which the proportion of diol component B is from 98 to 102 mol %, based on the total amount of components a1) and a2). In relation to preferred diols, the information given above is applicable.

Among the particularly preferred copolyesters, particular preference is given to those in which the polyester-forming constituents comprise, based on the total weight of the polyester, no more than 2% by weight of one or more further bifunctional compounds C which react with carboxylic acid groups or with hydroxy groups to form bonds. In relation to preferred compounds C, the information given above is applicable.

Within the particularly preferred copolyesters, it is preferable that components a1), a2), and b) make up from 96 to 99.8% by weight of the particularly preferred copolyester.

The copolyesters are to some extent known, e.g. from EP-A 488 617, WO 96/15173, and WO 04/67632, or can be produced by methods known per se. It is particularly preferable to produce the copolyesters by the continuous process described in EP Application No. 08154541.0.

In one first embodiment, the copolyesters described are synthesized in a two-stage reaction cascade. The general method begins by reacting the dicarboxylic acids or their derivatives A together with component B and optionally D in the presence of an esterification catalyst (or if the carboxylic acids A are used in the form of their esters, in the presence of a transesterification catalyst) to give a prepolyester. The intrinsic viscosity (IV) of said prepolyester is generally from 50 to 100 mL/g, preferably from 60 to 90 mL/g. The catalysts used generally comprise zinc catalysts, aluminum catalysts, and in particular titanium catalysts. An advantage of titanium catalysts, such as tetra(isopropyl) orthotitanate and in particular tetrabutyl orthotitanate (TBOT), over the tin catalysts, antimony catalysts, cobalt catalysts, and lead catalysts frequently used in the literature, an example being tin dioctanoate, is that if any residual amounts of the catalyst or of downstream products of the catalyst remain within the product, they are less toxic. This is a particularly important factor for the biodegradable polyesters, since they pass directly into the environment, by way of example in the form of composting bags or mulch films. The polyesters of the invention are then optionally chain-extended by the processes described in WO 96/15173 and EP-A 488 617. The prepolyester is, by way of example, reacted with chain extenders C), e.g. with diisocyanates, or with epoxy-containing polymethacrylates, in a chain-extension reaction to give a polyester with IV of from 60 to 450 mL/g, preferably from 80 to 250 mL/g.

In another method, component A is first condensed in the presence of an excess of component B and optionally D, together with the catalyst. The melt of the resultant prepolyester is then condensed, usually at an internal temperature of from 200 to 250° C., while diol liberated is removed by distillation, until the desired viscosity has been reached, the intrinsic viscosity (IV) being from 60 to 450 mL/g, and preferably from 80 to 250 mL/g. Said condensation reaction generally takes place within a period of from 3 to 6 hours at reduced pressure. A reaction with the chain extender of component D then optionally follows.

It is particularly preferable to produce the copolyesters by the continuous process described in EP Application No. 08154541.0. Here, by way of example, a mixture made of components A and B and optionally of further comonomers is mixed to give a paste, without addition of any catalyst, or as an alternative the liquid esters of component A and component B and optionally further comonomers are fed to the reactor, without addition of any catalyst, and 1. in a first stage, said mixture is continuously esterified or, respectively, transesterified together with the entire amount or a portion of the catalyst;
2. in a second stage, optionally with the remaining amount of catalyst, the transesterification or esterification product obtained in 1.) is continuously precondensed preferably in a tower reactor, where the product stream is conducted cocurrently by way of a falling-film cascade, and the reaction vapors are removed in situ from the reaction mixture—until an intrinsic viscosity of from 20 to 60 mL/g to DIN 53728 has been reached;
3. in a third stage, the product obtainable from 2.) is continuously polycondensed—preferably in a cage reactor—until an intrinsic viscosity of from 70 to 130 mL/g to DIN 53728 has been reached and optionally
4. in a fourth stage, the product obtainable from 3.) is continuously reacted in a polyaddition reaction with a chain extender in an extruder, List reactor, or static mixer, until an intrinsic viscosity of from 80 to 250 mL/g to DIN 53728 has been reached.

The abovementioned intrinsic viscosity ranges serve merely as guides to preferred process variants, and are not intended to have any restricting effect on the subject matter of the present application.

The copolyesters of the invention can be produced not only by the continuous process described above but also in a batch process. For this, components A, B, and optionally D are mixed in any desired feed sequence and condensed to give a prepolyester. A polyester with the desired intrinsic viscosity can be obtained with the optional aid of component D.

The number-average molecular weight $M_N$ of the preferred copolyesters is generally in the range from 5,000 to 1,000,000 daltons, in particular in the range from 8,000 to 800,000 daltons, and specifically in the range from 10,000 to 500,000 daltons. The weight-average molecular weight $M_W$ of the copolyesters preferred in the invention is generally in the range from 20,000 to 5,000,000 daltons, frequently in the range from 30,000 daltons to 4,000,000 daltons, and in particular in the range from 40,000 to 2,500,000 daltons. The polydispersity index $M_W/M_N$ is generally at least 2, and is frequently in the range from 3 to 25, in particular in the range from 5 to 20. The copolyesters are preferably semicrystalline and preferably have a melting point or melting range in the range from 80 to 170° C., in particular in the range from 90 to 150° C. The intrinsic viscosity of the copolyesters is typically in the range from 50 to 500 ml/g, frequently in the range from 80 to 300 ml/g, and in particular in the range from 100 to 250 ml/g (determined to EN ISO 1628-1 at 25° C. on a 0.5% strength by weight solution of the polymer in o-dichlorobenzene/phenol (1:1 w/w)). The preferred copolyesters are characterized firstly via high melt viscosity $\eta_0$, which at 180° C. is generally at least 60 Pa·s, frequently at least 80 Pa·s, in particular at least 100 Pa·s, e.g. from 60 to 20,000 Pa·s, in particular from 80 to 15,000 Pa·s, and specifically from 100 to 10,000 Pa·s, and via a low acid number, which is less than 5 mg KOH/g of polymer, in particular at most 3 mg KOH/g of polymer, and specifically at most 1 mg KOH/g of polymer.

The copolyesters, moreover, naturally have in essence no functional groups which make the polymers water-soluble. Accordingly, the number of sulfonic acid groups in the copolyester is generally less than 0.1 mmol/g of polymer, in particular less than 0.05 mmol/g of polymer, or less than 0.01 mmol/g of polymer.

In one specific embodiment of the invention, the polymers to be dispersed involve a semiaromatic copolyester, which is also termed copolyester Csp below, and which is characterized via the following constitution:

a1) from 60 to 80 mol %, frequently from 65 to 80 mol %, in particular from 66 to 75 mol %, based on the total amount of components a1) and a2), of at least one aliphatic dicarboxylic acid or ester-forming derivative thereof, or a mixture thereof, and a2) from 20 to 40 mol %, frequently from 20 to 35 mol %, in particular from 25 to 34 mol %, based on the total amount of components a1) and a2); of terephthalic acid or ester-forming derivatives thereof, or a mixture thereof;

b) from 98 to 102 mol % of at least one diol component b), which is selected from 1,3-propanediol and 1,4-butanediol and mixtures thereof;

d) from 0.1 to 2% by weight, frequently from 0.2 to 2% by weight, in particular from 0.3 to 1.8% by weight, and specifically from 0.4 to 1.5% by weight, based on the total amount of components a1) and a2), in each case calculated as dicarboxylic acids, and b), of one or more compounds D which have at least 3 functionalities which react with carboxylic acid groups or with hydroxy groups to form bonds;

where components a1), a2), and b) make up from 80 to 99.8% by weight, in particular from 90 to 99.7% by weight, and specifically from 95 to 99.6% by weight, of the polyester.

Copolyesters of this type are novel and, probably because of the defined amount of the polyfunctional compound D and defined terephthalic acid content, form particularly stable dispersions with low viscosity, without any requirement for the use of plasticizers, even when melt viscosities or zero-shear viscosities are relatively high. Copolyesters Csp having the abovementioned constitution are therefore provided per se by the present invention. The present invention likewise provides aqueous dispersions which comprise a copolyester Csp in the form of dispersed polymer particles.

Aliphatic dicarboxylic acids a1) that can be used are in principle the aliphatic dicarboxylic acids mentioned above. It is preferable that component a1) is selected from succinic acid, adipic acid, sebacic acid, azelaic acid, brassylic acid, and mixtures thereof, or else from the ester-forming derivatives thereof. In particular, component a1) is selected from adipic acid, sebacic acid, and mixtures thereof, or else from the ester-forming derivatives thereof.

Component a2) is terephthalic acid and ester-forming derivatives thereof.

The terephthalic acid a2) and the aliphatic dicarboxylic acid a1) can be used in the form of free acid or in the form of ester-forming derivatives. Particular ester-forming derivatives that may be mentioned are the di-$C_1$-$C_6$ alkyl esters, e.g. dimethyl, diethyl, di-n-propyl, diisopropyl, di-n-butyl, diisobutyl, di-tert-butyl, di-n-pentyl, diisopentyl, or di-n-hexyl ester. It is equally possible to use anhydrides of the dicarboxylic acids.

Component b), the diol, is preferably 1,4-butanediol.

Component d) that can be used in principle comprises the above-mentioned compounds D. It is preferable that compound D is selected from polyols which preferably have 3, 4, or 6 OH groups. Glycerol is particularly preferred.

The copolyesters Csp of the invention can be produced in accordance with the above for the copolyesters that are preferred in the invention, composed of components A, B, and optionally C and optionally D. In the method generally used, at the start of the polymerization reaction, the ratio of the diol (component b)) to the acids (components i and ii) is adjusted to be from 1.0 to 2.5:1 and preferably from 1.3 to 2.2:1. Excess amounts of diol are drawn off during the polymerization reaction, so that the ratio obtained at the end of the polymerization reaction is approximately equimolar. Approximately equimolar means a diol/diacids ratio of from 0.98 to 1.02:1. It is generally advisable to add the crosslinking (at least trifunctional) compounds D at a relatively early juncture in the polycondensation reaction.

The copolyesters Csp of the invention can have any desired ratio of hydroxy and/or carboxy end groups. The copolyesters Csp of the invention can also be end-group-modified. By way of example, therefore, it is possible to acid-modify OH end groups via reaction with phthalic acid, phthalic anhydride, trimellitic acid, trimellitic anhydride, pyromellitic acid, or pyromellitic anhydride. Preference is given to copolyesters Csp of the invention having acid numbers smaller than 5 mg KOH/g, in particular at most 3 mg KOH/g, and specifically at most 1 mg KOH/g.

In one preferred embodiment of the invention, compounds C and/or epoxides E are also used to produce the copolyesters Csp. Among these, preference is given to the difunctional isocyanates and isocyanurates thereof (group c7), bisoxazolines (group c5), and also the epoxides E mentioned above. Amount used of the compounds C and/or D is generally from 0.01 to 4% by weight, preferably from 0.2 to 3% by weight, and particularly preferably from 0.35 to 2% by weight, based on the polyester.

The number-average molecular weight $M_N$ of the copolyesters Csp is generally in the range from 5,000 to 1,000,000 daltons, in particular in the range from 8,000 to 800,000 daltons, and specifically in the range from 10,000 to 500,000 daltons. The weight-average molecular weight $M_W$ of the copolyesters Csp preferred in the invention is generally in the range from 20,000 to 5,000,000 daltons, frequently in the range from 30,000 daltons to 4,000,000 daltons, and in particular in the range from 40,000 to 2,500,000 daltons. The polydispersity index of the copolyesters Csp $M_W/M_N$ is generally at least 2, and is frequently in the range from 3 to 25, in particular in the range from 5 to 20. The copolyesters Csp are preferably semicrystalline and have a melting point or melting range in the range from 80 to 170° C., in particular in the range from 90 to 150° C. The intrinsic viscosity of the copolyesters Csp is typically in the range from 50 to 500 ml/g, frequently in the range from 80 to 300 ml/g, and in particular in the range from 100 to 250 ml/g (determined to EN ISO 1628-1 at 25° C. on a 0.5% strength by weight solution of the polymer in o-dichlorobenzene/phenol (1:1 w/w)). The copolyesters Csp are preferably characterized firstly via high melt viscosity $\eta_0$, which at 180° C. is generally at least 60 Pa·s, frequently at least 80 Pa·s, in particular at least 100 Pa·s, e.g. from 60 to 20,000 Pa·s, in particular from 80 to 15,000 Pa·s, and specifically from 100 to 10,000 Pa·s, and via a low acid number, which is less than 5 mg KOH/g of polymer, in particular at most 3 mg KOH/g of polymer, and specifically at most 1 mg KOH/g of polymer.

The invention also provides aqueous dispersions of the copolyesters Csp. The average diameter of the polymer particles (weight average, determined via light scattering) in said dispersions does not generally exceed a value of 10 μm, frequently 5 μm, in particular 2,000 nm, specifically 1,500 nm, being typically in the range from 50 nm to 10 μm, frequently in the range from 100 nm to 5 μm, in particular in the range from 150 to 2,000 nm, specifically in the range from 200 to 1,500 nm. It is preferable that the diameter of less than 90% by weight of the polymer particles will not exceed 10 μm, in particular 5 μm, and specifically 2 μm. Particle size is determined in a manner known per se via light scattering on dilute dispersions (from 0.01 to 1% by weight).

In contrast to the dispersions of the prior art, low-viscosity dispersions can be produced with the copolyesters Csp of the invention, even when polymer contents are high. When the viscosity of the dispersions obtainable in the invention is determined by the Brookfield method at 20° C., it is preferable that its value is at most 2 Pa·s, frequently at most 1 Pa·s, e.g. in the range from 1 to 2,000 mPa·s, in particular in the range from 10 to 1,000 mPa·s.

The polymer content of the dispersions obtainable in the invention comprising the copolyesters Csp is typically in the range from 10 to 60% by weight, frequently in the range from 20 to 55% by weight, and in particular in the range from 30 to 50% by weight.

In another embodiment of the invention, the polymers to be dispersed are polyalkylene carbonates, in particular polyethylene carbonates and polypropylene carbonates. Examples of suitable polyalkylene carbonates are the polyethylene carbonates which are known from EP-A 1264860 and which are obtained via copolymerization of ethylene oxide and carbon dioxide in the presence of suitable catalysts, and in particular polypropylene carbonate (see, for example, WO 2007/125039), obtainable via copolymerization of propylene oxide and carbon dioxide in the presence of suitable catalysts.

The polyalkylene carbonate chain can comprise either ether groups or carbonate groups. The proportion of carbonate groups in the polymer depends on the reaction conditions, a particular example being the catalyst used. More than 85%, and preferably more than 90%, of all of the linkages in the preferred polyalkylene carbonates are carbonate groups. Suitable zinc catalysts and cobalt catalysts are described in U.S. Pat. Nos. 4,789,727 and 7,304,172. Polypropylene carbonate can moreover be produced by analogy with Soga et al., Polymer Journal, 1981, 13, 407-10. The polymer is also obtainable commercially, and by way of example is marketed by Empower Materials Inc. or Aldrich.

The number-average molecular weight Mn of the polyalkylene carbonates is generally from 70,000 to 90,000 daltons. The weight-average molecular weight Mw is usually from 250,000 to 400,000 daltons. The ratio of the ether groups to carbonate groups in the polymer is from 5 to 90%. Polydispersity (ratio of weight average (Mw) to number average ($M_N$)) is generally from 1 to 80, and preferably from 2 to 10. The polypropylene carbonates used can comprise up to 1% of carbamate groups and urea groups.

Other suitable polyalkylene carbonates are chain-extended polyalkylene carbonates. Particular chain extenders used for the polyalkylene carbonates are maleic anhydride, acetic anhydride, di- or polyisocyanates, di- or polyoxazolines, or the corresponding oxazines, or di- or polyepoxides. Examples of isocyanates are tolylene 2,4-diisocyanate, tolylene 2,6-diisocyanate, diphenylmethane 2,2'-diisocyanate, diphenylmethane 2,4'-diisocyanate, diphenylmethane 4,4'-diisocyanate, naphthylene 1,5-diisocyanate, and xylylene diisocyanate, and in particular hexamethylene 1,6-diisocyanate, isophorone diisocyanate, or methylenebis(4-isocyanatocyclohexane). Particularly preferred aliphatic diisocyanates are isophorone diisocyanate and in particular hexamethylene 1,6-diisocyanate. Bisoxazolines that may be mentioned are 2,2'-bis(2-oxazoline), bis(2-oxazolinyl)methane, 1,2-bis(2-oxazolinyl)ethane, 1,3-bis(2-oxazolinyl)propane, or 1,4-bis(2-oxazolinyl)butane, in particular 1,4-bis(2-oxazolinyl)benzene, 1,2-bis(2-oxazolinyl)benzene, or 1,3-bis(2-oxazolinyl)benzene. The amounts preferably used of the chain extenders are from 0.01 to 5% by weight, preferably from 0.05 to 2% by weight, particularly preferably from 0.08 to 1% by weight, based on the amount of polycarbonate. The number-average molecular weight Mn of chain-extended polyalkylene carbonates is typically from 30,000 to 5,000,000 daltons, preferably from 35,000 to 250,000 daltons, and particularly preferably from 40,000 to 150,000 daltons.

In one embodiment of the present invention, the polymers P used can also comprise mixtures of various polymers P comprising ester groups, e.g. mixtures of the abovementioned copolyesters with polycaprolactones or with polylactides, or else a mixture of the polymers P comprising ester groups with other biopolymers, such as starch, or with modified biodegradable biopolymers, such as modified starch, cellulose ester (e.g. cellulose acetate, cellulose acetate butyrate), or with biodegradable artificial polymers, such as polylactide (obtainable for example in the form of EcoPLA® (Cargill)).

In preferred embodiments of the process of the invention, the dispersed polymers are biodegradable polymers. Among these are in particular the abovementioned aliphatic polyesters, in particular polylactides, and polycaprolactones, and copolyesters based thereon, and also the abovementioned aliphatic and aliphatic-aromatic copolyesters, where these are composed of the monomers A and B and optionally C and/or D.

Biodegradability to DIN V 54900 means that the polymers decompose in an appropriate and demonstrable period of time when exposed to the effects of the environment. The degradation mechanism can be hydrolytic and/or oxidative, and is based mainly on exposure to microorganisms, such as bacteria, yeasts, fungi, and algae. An example of a method for determining biodegradability mixes the polymer with compost and stores it for a particular time. According to ASTM D5338, ASTM D6400, EN 13432, and DIN V 54900, $CO_2$-free air, by way of example, is passed through ripened compost during the composting process, and this compost is subjected to a defined temperature program. Biodegradability is defined here by way of the ratio of the net amount of $CO_2$ liberated from the specimen (after deducting the amount of $CO_2$ liberated by the compost without the specimen) to the maximum possible amount of $CO_2$ liberated by the specimen (calculated from the carbon content of the specimen). Even after a few days of composting, biodegradable polymers generally show marked signs of degradation, for example fungal growth, cracking, and perforation.

In another method of determining biodegradability, the polymer is incubated with a certain amount of a suitable enzyme at a certain temperature for a defined period, and then the concentration of the organic degradation products dissolved in the incubation medium is determined. By way of example, by analogy with Y. Tokiwa et al., American Chemical Society Symposium 1990, Chapter 12, "Biodegradation of Synthetic Polymers Containing Ester Bonds", the polymer can be incubated for a number of hours at from 30 to 37° C. with a predetermined amount of a lipase, for example from *Rhizopus arrhizus, Rhizopus delemar, Achromobacter* sp., or *Candida cylindracea*, and the DOC value (dissolved organic carbon) can then be measured on the reaction mixture freed from insoluble constituents. For the purposes of the present invention, biodegradable polymers are those which after enzymatic treatment with a lipase from *Rhizopus arrhizus* for 16 h at 35° C. give a DOC value which is at least 10 times higher than that for the same polymer which has not been treated with the enzyme.

The polymer dispersions obtainable by the process of the invention are likewise provided by the present invention. They generally feature very fine distribution of the polyester particles in the disperse phase.

The average diameter of the polymer particles (weight average, determined via light scattering) does not generally exceed a value of 10 µm, frequently 5 µm, being typically in the range from 50 nm to 10 µm, frequently in the range from 100 nm to 5 µm. It is preferable that the diameter of less than 90% by weight of the polymer particles will not exceed 15 µm, in particular 10 µm, and specifically 5 µm. Particle size is determined in a manner known per se via light scattering on dilute dispersions (from 0.01 to 1% by weight).

In contrast to the dispersions of the prior art, low-viscosity dispersions can be produced with the process of the invention, even when polymer contents are high. When the viscosity of the dispersions obtainable in the invention is determined by the Brookfield method at 20° C., it is preferable that its value is at most 2 Pa·s, frequently at most 1 Pa·s, e.g. in the range from 1 to 2,000 mPa·s, in particular in the range from 10 to 1,000 mPa·s.

The polymer content of the dispersions obtainable in the invention is typically in the range from 10 to 60% by weight, frequently in the range from 20 to 55% by weight, and in particular in the range from 30 to 50% by weight.

The polymer dispersions obtainable by the process of the invention and the polymer dispersions of the invention are suitable for a wide variety of applications which are usually relevant to aqueous polymer dispersions. The polymer dispersions obtainable by the process of the invention, and the polymer dispersions of the invention, in particular those in which the polymer is a copolyester, have particular suitability for applications in which biodegradability of the polymer constituent is desirable. The aqueous dispersions are particularly suitable as binder constituent in aqueous binder compositions, in particular for binder compositions for papermaking, e.g. as sizes for paper, in particular as engine sizes, or as surface sizes, as strengtheners for paper, as binders for paper-coating processes, and also as coatings for producing barrier coatings on paper, paperboard or card, and also in binder compositions for producing nonwovens. The aqueous dispersions are moreover suitable for use in adhesives, for example in the form of lamination adhesives, and specifically in the form of lamination adhesives for the lamination of plastics foils to flat substrates, such as paper, paperboard, card or plastics foils, or for the formulation of active ingredients. The polymer dispersions of the invention can also be used for producing foil materials.

One particularly preferred use of aqueous polymer dispersions of the invention or obtainable in accordance with the invention is the use thereof for the production of barrier coatings on sheetlike, water-vapor-permeable substrates such as paper, paperboard or card. For these purposes, the polymer dispersion, optionally after formulation with typical auxiliaries, such as thickeners or bactericides, is applied to the sheetlike, water-vapor-permeable substrate and is subsequently dried. The application rate is generally made such as to result in a coating thickness, calculated as polymer, in the range from 1 to 50 $g/m^2$, more particularly in the range from 5 to 30 $g/m^2$. The formulated dispersion comprises generally not more than 20% by weight, more particularly not more than 10% by weight, based on the total solids content of the formulated dispersion, of subsequently introduced auxiliaries; in other words, the total amount of polymer and surface-active substance accounts in general for at least 80% by weight, more particularly at least 90% by weight, based on the total solids content of the formulated dispersion. The application of the aqueous polymer dispersion to the sheetlike, water-vapor-permeable substrate, such as paper, paperboard or card more particularly, may take place by means of customary apparatus for applying aqueous polymer dispersions to sheetlike substrates, as for example by means of sizing presses, film presses, blade coaters, airbrushes, doctor blades, by means of curtain coating, or using spray coaters.

In preferred embodiments of dispersions of the invention, the dispersed polymers are biodegradable polymers. Among these are in particular the abovementioned aliphatic polyesters, in particular polylactides and polycaprolactones, and copolyesters based thereon, and also the abovementioned aliphatic and aliphatic-aromatic copolyesters, where these are composed of the monomers A and B and optionally C and/or D.

Examples are used below to illustrate the invention.
Analytical Methods

To determine zero-shear viscosity $\eta_0$, dynamic viscosity measurement was used on the polymer melts at 180° C., using oscillatory low-amplitude shear, at shear rates in the range from 0.01 to 500 s$^{-1}$ and a shear amplitude of 100 Pa to determine viscosity curves, and this measurement was used to determine zero-shear viscosity $\eta_0$ via extrapolation to a shear rate of 0 s$^{-1}$. The viscosity curves were determined by using a "Dynamic Stress Rheometer (DSR)" from Rheometrics, with plate-on-plate geometry (diameter 25 mm, gap 1 mm).

The shear viscosity of the polymer melt under the dispersing conditions was determined by dynamic viscosity measurement of the polymer melts using a rotational rheometer (SR5) from Rhemotrics at the temperature indicated in the examples.

The viscosity of the dispersing medium under the dispersing conditions was determined by the Brookfield method using a rotational rheometer MCR301 from Anton Paar GmbH, at the temperature indicated in the examples, the measurement being carried out to a shear rate of 1,000/s and the viscosity under dispersing conditions being determined by extrapolation to the shear rate corresponding to the example.

Intrinsic viscosity was determined to EN ISO 1628-1 at 25° C. on a 0.5% strength by weight solution of the polymer in o-dichlorobenzene/phenol (1:1 w/w).

Molecular weights were determined via gel permeation chromatography (GPC) to DIN 55672-1.

Particle size distribution was determined on a 1% strength by weight dilution of the dispersion, via light scattering at 25° C.

The Brookfield viscosity of the dispersions was determined at 20° C. to DIN EN ISO 2555 using a Physika MCR rotational viscometer with CC 27 Couette geometry.

PRODUCTION OF COPOLYESTERS CSP

Production Example 1

Polyester A1

Polybutylene terephthalate adipate, produced as follows: 583.3 g of terephthalic acid (27 mol %), 1280.2 g of adipic acid (73 mol %), 1405.9 g of 1,4-butanediol (130 mol %), and 37 g of glycerol (1.5% by weight, based on the polymer) mixed together with 1 g of tetrabutyl orthotitanate (TBOT), where the molar ratio of alcohol component to acid component was 1.30. The reaction mixture was heated to a temperature of 210° C. and the water produced was removed by distillation at said temperature over a period of 2 h. The temperature was then increased to 240° C. and the system was evacuated in stages. Excess 1,4-butanediol was removed by distillation in vacuo (<1 mbar) over a period of 2 h.

The number-average molar mass of the resultant polyester A1 was 20,400 g/mol, and the weight-average molar mass was 140,000 g/mol. Intrinsic viscosity IV was 147. Melting point was 60° C. Zero-shear viscosity $\eta_0$ at 180° C. was 630 Pa·s. The acid number was 0.6 mg KOH/g.

Production Example 2

Polyester A2

Polybutylene terephthalate adipate, produced as follows: 697.7 g of terephthalic acid (35 mol %), 1139.9 g of adipic acid (65 mol %), 1405.9 g of 1,4-butanediol (130 mol %), and 37.3 ml of glycerol (1.5% by weight, based on the polymer) were mixed together with 2.12 ml of tetrabutyl orthotitanate (TBOT), where the molar ratio of alcohol component to acid component was 1.30. The reaction mixture was heated to a temperature of 210° C. and the water produced was removed by distillation at said temperature over a period of 2 h. The temperature was then increased to 240° C. and the system was evacuated in stages. Excess 1,4-butanediol was removed by distillation in vacuo (<1 mbar) over a period of 1.5 h.

The number-average molar mass of the resultant copolyester was 16,300 g/mol, and the weight-average molar mass was 126,000 g/mol. Intrinsic viscosity IV was 131. Melting point was 80° C. Zero-shear viscosity $\eta_0$ at 180° C. was 370 Pa·s. The acid number was less than 1 mg KOH/g.

Production Example 3

Polyester A3

Polybutylene terephthalate adipate, produced as follows: 697.7 g of terephthalic acid (35 mol %), 1139.9 g of adipic acid (65 mol %), 1405.9 g of 1,4-butanediol (130 mol %), and 37.3 ml of glycerol (1.5% by weight, based on the polymer) were mixed together with 2.12 ml of tetrabutyl orthotitanate (TBOT), where the molar ratio of alcohol component to acid component was 1.30. The reaction mixture was heated to a temperature of 210° C. and the water produced was removed by distillation at said temperature over a period of 2 h. The temperature was then increased to 240° C. and the system was evacuated in stages. Excess 1,4-butanediol was removed by distillation in vacuo (<1 mbar) over a period of 2 h.

The number-average molar mass of the resultant copolyester was 19,500 g/mol, and the weight-average molar mass was 178,000 g/mol. Intrinsic viscosity IV was 161.

Melting point was 80° C. Zero-shear viscosity $\eta_0$ at 180° C. was 1,300 Pa·s. The acid number was less than 1 mg KOH/g.

Production Example 4

Polyester A4

Polybutylene terephthalate adipate, produced as follows: 726.8 g of terephthalic acid (35 mol %), 1187.4 g of adipic acid (65 mol %), 1464.5 g of 1,4-butanediol (130 mol %), and 4.12 ml of glycerol (0.2% by weight, based on the polymer) were mixed together with 2.21 ml of tetrabutyl orthotitanate (TBOT), where the molar ratio of alcohol component to acid component was 1.30. The reaction mixture was heated to a temperature of 210° C. and the water produced was removed by distillation at said temperature over a period of 2 h. The temperature was then increased to 240° C. and the system was evacuated in stages. Excess 1,4-butanediol was removed by distillation in vacuo (<1 mbar) over a period of 3 h.

The number-average molar mass of the resultant copolyester was 26 000 g/mol, and the weight-average molar mass was 140 000 g/mol. Intrinsic viscosity IV was 157. Melting point was 80° C. Zero-shear viscosity no at 180° C. was 720 Pa·s. The acid number was less than 1 mg KOH/g.

Production Example 5

Polyester A5

Polybutylene terephthalate adipate, produced as follows: 1095.2 g of terephthalate (47 mol %), 700 g of 1,4-butanediol (65 mol %), and 1 ml of glycerol (0.05% by weight, based on the polymer) were first mixed together with 1.1 ml of tetrabutyl orthotitanate (TBOT), and the mixture was heated to 160° C. The methanol formed was distilled off over a period of 1 h. The reactor was then cooled to around 140° C. Added thereto subsequently were 929.5 g of adipic acid (53 mol %), 700 g of 1,4-butanediol (65 mol %), and 1 ml of glycerol (0.05% by weight, based on the polymer), together with 1.04 ml of tetrabutyl orthotitanate (TBOT). The reaction mixture was heated to a temperature of 190° C. and the water produced was removed by distillation at said temperature over a period of 1 h. The temperature was then increased to 240° C. and the system was evacuated in stages. Excess 1,4-butanediol was removed by distillation in vacuo (<1 mbar) over a period of 1 h.

The number-average molar mass of the resultant copolyester was 21,000 g/mol, and the weight-average molar mass was 59,000 g/mol. Intrinsic viscosity IV was 106. Zero-shear viscosity $\eta_0$ at 180° C. was 136 Pa·s. The acid number was less than 1 mg KOH/g.

Production Example 6

Polyester A6

Polybutylene terephthalate adipate, produced as follows: 71.1 g of the sodium salt of the dimethyl ester of 3-hydroxysulfonylisophthalic acid (dimethyl-NaSIP, 2 mol %), 1048.6 g of terephthalate (45 mol %), 700 g of 1,4-butanediol (65 mol %) were first mixed together with 1.1 ml of tetrabutyl orthotitanate (TBOT), and the mixture was heated to 160° C. The methanol formed was distilled off over a period of 1 h. The reactor was then cooled to around 140° C. Added thereto were 929.5 g of adipic acid (53 mol %), 700 g of 1,4-butanediol (65 mol %), and 2 ml of glycerol (0.1% by weight, based on the polymer), together with 1.04 ml of tetrabutyl orthotitanate (TBOT). The reaction mixture was heated to a temperature of 190° C. and the water produced was removed by distillation at said temperature over a period of 1 h. The temperature was then increased to 240° C. and the system was evacuated in stages. Excess 1,4-butanediol was removed by distillation in vacuo (<1 mbar) over a period of 1.5 h.

The number-average molar mass of the resultant copolyester was . . . Intrinsic viscosity IV was 137. Zero-shear viscosity $\eta_{10}$ at 180° C. was 3,280 Pa·s. The acid number was less than 1 mg KOH/g.

Production Example 7

Copolyester B1, Chain-Extended

Polybutylene terephthalate adipate, produced as follows: 92.7 kg of terephthalate (40 mol %), 58.5 kg of 1,4-butanediol (65 mol %), and 0.1 kg of glycerol (0.05% by weight, based on the polymer) were mixed together with 0.014 kg of tetrabutyl orthotitanate (TBOT), and the mixture was heated to 160° C. The methanol formed was distilled off over a period of 1 h. The reactor was then cooled to around 140° C. Admixed were 83.3 kg of adipic acid (60 mol %), 58.5 kg of 1,4-butanediol (65 mol %), and 0.1 kg of glycerol (0.05% by weight, based on the polymer), together with 0.014 kg of tetrabutyl orthotitanate (TBOT). The reaction mixture was heated to a temperature of 190° C. and the water produced was removed by distillation at said temperature over a period of 1 h. The temperature was then increased to 250° C. and the system was evacuated in stages. Excess 1,4-butanediol was removed by distillation in vacuo, at 8 mbar, over a period of 50 min. Subsequently, at 240° C., 0.9 kg of hexamethylene diisocyanate was metered in slowly over a period of 1 h.

The number-average molar mass of the resultant copolyester was 32,000 g/mol, and the weight-average molar mass was 170,000 g/mol. Zero-shear viscosity $\eta_0$ at 180° C. was 4010 Pa·s.

Production Example 8

Copolyester B2, Chain-Extended

A polybutylene terephthalate adipate, produced as follows: 69.4 kg of dimethyl terephthalate (35 mol %), 90.2 kg of adipic acid (65 mol %), 117 kg of 1,4-butanediol, and 0.4 g of glycerol (0.2% by weight, based on the polymer) were mixed together with 0.028 kg of tetrabutyl orthotitanate (TBOT), where the molar ratio of alcohol component to acid component was 1.30. The reaction mixture was heated to a temperature of 180° C., and was reacted at said temperature for 6 h. The temperature was then increased to 240° C., and the excess dihydroxy compound was removed by distillation in vacuo over a period of 3 h. 0.9 kg of hexamethylene diisocyanate was then metered slowly into the mixture over a period of 1 h at 240° C.

The number-average molar mass of the resultant copolyester was 32,000 g/mol, and the weight-average molar mass was 170,000 g/mol. Zero-shear viscosity $\eta_0$ at 180° C. was 2,510 Pa·s.

Production Examples 9 to 13

The copolyesters of production examples 9 to 13 were produced by analogy with production example 1 (and, respectively, production example 7). The molar constitutions of the copolyesters are collated in Table 2, and their properties are collated in Table 3. The acid number was in all cases less than 1 mg KOH/g.

TABLE 1

| Prod. Ex. | T [mol %][1)2)] | A [mol %][1)2)] | BD [mol %][1)2)] | G [% by wt.][1)3)] |
|---|---|---|---|---|
| 9 | 35 | 65 | 100 | 1.5 |
| 10 | 27 | 73 | 100 | 0.12 |
| 11 (comp)[4)] | 0 | 100 | 100 | 1.5 |
| 12[5)] | 44 | 56 | 100 | 0.1 |
| 13 | 47 | 53 | 100 | 0.1 |

[1)]T = terephthalic acid, A = adipic acid, BD = 1,4-butanediol, G = glycerol
[2)]based on the total amount of terephthalic acid + adipic acid in the polyester
[3)]based on the total weight of the polyester
[4)]comparative example
[5)]chain-extended, by analogy with production example 5

TABLE 3

| Prod. Ex. | $M_N$ | $M_W$ | IV[1] | MP [° C.][2] | $\eta_0$[3] [Pa·s] |
|---|---|---|---|---|---|
| 9 | 18 400 | 230 000 | 190 | 80 | 2500 |
| 10 | 22 600 | 76 300 | 130 | 64 | 164 |
| 11 (comp)[4] | 25 000 | 180 000 | 160 | 60 | 350 |
| 12 | 32 000 | 130 000 | 180 | n.d. | 5600 |
| 13 | 28 000 | 108 000 | 134 | n.d. | 753 |

[1]intrinsic viscosity
[2]melting point
[3]zero-shear viscosity at 180° C.
[4]comparative example Production of the Aqueous Polyester Dispersions Dispersion Example 1

The emulsion trials were carried out in an experimental system comprising (a) a Cavitron CD 10 rotor-stator mixer from Cavitron, with two inlets and one outlet, (b) a Tech-line E16 T single-screw extruder from Dr. Colin GmbH, connected by way of a heated line to the first inlet of the rotor-stator mixer, (c) a heated, pressure-tight storage vessel for the aqueous dispersion medium, provided on the outlet side with a gear pump for conveying the dispersion medium, where the pump was connected by way of a pressure-tight line to the second inlet of the rotor-stator mixer, a cooler, connected by way of a pressure-retaining system to the outlet of the rotor-stator mixer, and also a storage vessel, for collecting the dispersion, attached to the outlet of the cooler. The rotor-stator mixer was operated at 4,000 rpm.

An amount of 0.3 kg/h of pellets of the aliphatic-aromatic copolyester from production example 12 were drawn by way of the feed hopper into the single-screw extruder, where they were melted at 200° C. From there, the melt was conveyed into the rotor-stator mixer. At the same time, by means of the gear pump, a 5% strength by weight solution of polyvinyl alcohol (Kuraray Poval 235) heated to 180° C. in water was conveyed at a rate of 2.5 kg/h into the rotor-stator mixer. The temperature in the rotor-stator mixer was from 165 to 170° C., and the pressure at the outlet of the mixer varied from 8 to 12 bar. The aqueous emulsion produced at the outlet of the mixer was cooled to 20° C. by means of the cooler. This method gave an aqueous, solvent-free dispersion with 11% by weight polyester content. The particle-size-distribution curve determined by means of light scattering exhibited a main peak with a maximum at 700 nm and a further peak with a maximum at 1,000 nm.

Dispersion Example 2

The rotor-stator mixer used comprised a 3-stage in-line-dispersion apparatus which had three rotor-stator-mixer units arranged in series on a shared rotor, where the first and third stage of the apparatus had elements in the form of screw threads and the second and third stage had shear elements in the nature of toothed rings.

An amount of 0.83 kg/h of the copolyester from production example 10 ($\eta_0$=164 Pa·s) was drawn continuously by way of the feed hopper into the single-screw extruder (Tech-line E 16 T from Dr. Colin GmbH), where it was melted at 135° C. The polymer melt was fed to the first-stage dispersion apparatus (3000 rpm). The shear rate was 8960 s$^{-1}$ and the polymer viscosity at this shear rate was 35 Pa·s. At the same time, a 7% strength by weight aqueous solution of a partially hydrolyzed polyvinyl alcohol (Kuraray Poval 224E) which comprised 1% by weight of an anionic surfactant (Emulphor FAS 30 from BASF SE) was fed into the three stages of the in-line-dispersion apparatus. The viscosity of the aqueous solution of polyvinyl alcohol and Emulphor FAS 30 was 0.041 Pa·s. The solids contents in the first and second stage were 47% by weight and, respectively, 35% by weight. The solids content in the third stage was set to 29% by weight. The temperature in the first and second stage was 135° C., and in the third stage it was 120° C. The total residence time was 2 min. After it had left the third stage, the dispersion was quenched to 20° C. by means of a cooling bath.

The resultant dispersion exhibited the following particle-size distribution: $d_{90}$=10.9 μm and $d_{43}$=6.2 μm.

The pH of the dispersion was 5.5, and the viscosity (at 25° C.) was 80 mPa·s.

Dispersion Example 3

The rotor-stator mixer used comprised a 12-stage in-line-dispersion apparatus, the apparatus having shear elements in the nature of toothed rings.

An amount of 1.2 kg/h of the copolyester from production example 5 ($\eta_0$=136 Pa·s) was drawn continuously by way of the feed hopper into the single-screw extruder (Tech-line E 16 T from Dr. Colin GmbH), where it was melted at 150° C. The polymer melt was fed to the first-stage dispersion apparatus (4,000 rpm). The shear rate was 12,566 s$^{-1}$ and the polymer viscosity at this shear rate was 17 Pa·s. At the same time, a 7% strength by weight aqueous solution of a partially hydrolyzed polyvinyl alcohol (Kuraray Poval 224E) which comprised 1% by weight of an anionic surfactant (Emulphor FAS 30 from BASF SE) having a solution viscosity of 0.038 Pa·s was fed into the in-line-dispersion apparatus in such a way that the solids contents in the first and fourth stage were 55% by weight and, respectively, 45% by weight. The solids content in the tenth stage was set to 40% by weight. The temperature in the first ten stages was 150° C.; in the eleventh and twelfth stages it was 130° C. The total residence time was 1.2 min. After it had left the final stage, the dispersion was quenched to 20° C. by means of a cooling bath.

The resultant dispersion exhibited the following particle-size distribution: $d_{90}$=3.8 μm and $d_{43}$=2.3 μm.

The pH of the dispersion was 5.5, and the viscosity (at 25° C.) was 1.6 Pa·s.

Dispersion Example 4

The rotor-stator mixer used comprised a 3-stage in-line-dispersion apparatus which had three rotor-stator-mixer units arranged in series on a shared rotor, where the first and third stage of the apparatus had elements in the form of screw threads and the second and third stage had shear elements in the nature of toothed rings.

An amount of 0.45 kg/h of the copolyester from production example 6 ($\eta_0$=2810 Pa·s) was drawn continuously by way of the feed hopper into the single-screw extruder (Tech-line E 16 T from Dr. Colin GmbH), where it was melted at 140° C. The polymer melt was fed to the first-stage dispersion apparatus (3000 rpm). At the same time, a 2% strength by weight aqueous solution of a partially hydrolyzed polyvinyl alcohol (Kuraray Poval 224E) was fed into the three stages of the in-line-dispersion apparatus. The solids contents in the first and second stage were about 52% by weight and, respectively, 40% by weight. The solids content in the third stage was set to 30% by weight. The temperature in the first and second stage was 140° C., and in the third stage it was 120° C.

The total residence time was 2 min. After it had left the third stage, the dispersion was quenched to 20° C. by means of a cooling bath.

The resultant dispersion exhibited a multimodal particle-size distribution with peaks at $d_{43}=0.33$ μm, $d_{43}=2.5$ μm, and $d_{43}=6.5$ μm. The pH of the dispersion was 5.2, and the viscosity (at 25° C.) was 60 mPa·s.

Application of the Aqueous Polyester Dispersions as Barrier Coating on Paper

Application Example 1

Wood-free base paper (from Magnostar, 70 g/m$^2$) was coated on one side using a manual coating bar (#3) at a speed stage of 5 with the aqueous polyester dispersion from dispersion example 4. The coated paper was then dried in a drying cabinet at 110° C. for 1 min. This gave a coated paper having a polyester coating of 16 g/m$^2$ (solids).

Application Example 2

Wood-free base paper (from Magnostar, 58 g/m$^2$) was coated twice on one side at a speed of 10 m/min, using a laboratory coating machine (BASF, in-house design) with the aqueous polyester dispersion from dispersion example 4, and was immediately dried by means of IR radiation. This gave a coated paper having a polyester coating of 14 g/m$^2$ (solids).

Testing of the Barrier Properties

The barrier properties of the polyester-dispersion-coated papers from application examples 1 and 2 were subsequently investigated using the Oil Penetration Test. For this test, the coated side of the paper was wetted with 2 ml of oleic acid. The paper was then stored for a relatively long time at 60° C. The reverse of the coated paper was then inspected for spotting.

The surface of the coated paper from application example 1 showed no (i.e., 0%) spots after 1 h of storage at 60° C. This corresponds to an oil penetration of 0% at 60° C. for 1 h. The uncoated Magnostar base paper (70 g/m$^2$) showed 100% oil penetration after just 5 min of storage at 60° C.

The surface of the coated paper from application example 2 showed no (i.e., 0%) spots after 16 h of storage at 60° C. This corresponds to an oil penetration of 0% at 60° C. for 16 h. The uncoated Magnostar base paper (58 g/m$^2$) showed 100% oil penetration after just 5 min of storage at 25° C.

The invention claimed is:

1. A process for producing aqueous dispersions of thermoplastic polymers which have a plurality of ester groups and/or carbonate groups in the main polymer chain and which have an acid number of less than 5 mg KOH/g, and which have a zero-shear viscosity $\eta_0$ of at least 60 Pa·s at 180° C.,
   which comprises introducing a composition which comprises the polymer and which is composed of at least 99% by weight of the polymer at a temperature above the melting or softening point of the polymer, into an aqueous dispersion medium which comprises at least one surfactant substance, and the resultant aqueous emulsion of the polymer is quenched,
   wherein the introduction of the polymer into the aqueous dispersion medium is carried out in a mixing apparatus which has at least one rotor-stator mixer and the mixing apparatus has a plurality of rotor-stator mixers connected to one another in series.

2. The process according to claim 1, wherein the rotor-stator mixer has means of generating cavitation forces.

3. The process according to claim 1, wherein the rotor-stator mixer is a toothed-ring dispersing machine.

4. The process according to claim 3, wherein the toothed-ring dispersing machine has a conical stator with a concentric frustoconical recess and a likewise concentric conical rotor, wherein the rotor protrudes into the frustoconical operating chamber of the stator in such a way as to form an annular operating chamber, into which, on the side of the rotor and of the stator, teeth protrude, and are arranged respectively in the form of one or more coaxial toothed rings on the rotor and on the stator, in such a way that the toothed rings undergo mutual offset intermeshing.

5. The process according to claim 1, wherein the composition which comprises the thermoplastic polymer, and which is composed of at least 99% by weight of the polymer, is mixed at a temperature above the melting or softening point of the polymer, in a first rotor-stator mixer, with a portion of the aqueous dispersion medium, and the resultant aqueous emulsion of the polyester is mixed with further aqueous dispersion medium in the further rotor-stator mixer(s).

6. The process according to claim 5, wherein the mixing temperature in the first of the rotor-stator mixers connected to one another in series is at least 20 K above the temperature in the last of the rotor-stator mixers connected to one another in series.

7. The process according to claim 1, wherein the introduction of the melt into the aqueous dispersion medium takes place at a temperature which is at least 20 K above the melting or softening point of the polymer.

8. The process according to claim 1, wherein the polymer is a polyester, polyetherester, polyesteramide, polycarbonate, or mixtures of these.

9. The process according to claim 8, wherein the polymer is an aliphatic polyester, aliphatic copolyester, aliphatic-aromatic copolyester, or mixtures of these.

10. The process according to claim 1, wherein the polymer is a polyester which in essence is composed of:
   a) at least one dicarboxylic acid component A, which is composed of
      a1) at least one aliphatic or cycloaliphatic dicarboxylic acid or ester-forming derivatives thereof, or a mixture thereof, and
      a2) optionally one or more aromatic dicarboxylic acids or ester-forming derivatives thereof, or a mixture thereof;
   b) at least one diol component B, selected from aliphatic and cycloaliphatic diols and mixtures thereof;
   c) optionally one or more further bifunctional compounds C which react with carboxylic acid groups or with hydroxy groups to form bonds; and
   d) optionally one or more compounds D which have at least 3 functionalities which react with carboxylic acid groups or with hydroxy groups to form bonds;
   wherein the compounds a1), a2), B), C), and D) comprise not more than 3 mol %, based on the total amount of compounds of component A, of compounds which have one or more sulfonic acid groups, and wherein the molar ratio of component A to component B is in the range from 0.4:1 to 1:1, and components A and B make up at least 80% by weight of the polyester.

11. The process according to claim 10, wherein the polymer is a polyester which in essence is composed of:
   a) at least one dicarboxylic acid component A, which is composed of
      a1) from 35 to 90 mol % of at least one aliphatic or cycloaliphatic dicarboxylic acid or ester-forming derivatives thereof, and a2) from 10 to 65 mol % of one or more aromatic dicarboxylic acids or ester-forming derivatives thereof, or a mixture thereof;

b) from 98 to 102 mol %, based on the total amount of components a1) and a2), of at least one diol component B, selected from aliphatic and cycloaliphatic diols and mixtures thereof;

c) from 0 to 2% by weight, based on the total weight of the polyester, of one or more further bifunctional compounds C which react with carboxylic acid groups or with hydroxy groups to form bonds; and d) from 0 to 2% by weight, based on the total weight of the polyester, of one or more compounds D which have at least 3 functionalities which react with carboxylic acid groups or with hydroxy groups to form bonds;

wherein the aromatic dicarboxylic acids a2) can comprise up to 3 mol %, based on the total amount of compounds of component A, of aromatic dicarboxylic acids which have one or more sulfonic acid groups.

12. The process according to claim 10, wherein the compounds a1), a2), B), C), and D) comprise no compounds which have one or more sulfonic acid groups.

13. The process according to claim 10, wherein the aromatic dicarboxylic acids a2) comprise 0.1 to 3 mol %, based on the total amount of compounds of component A, of compounds which have one or more sulfonic acid groups.

14. The process according to claim 9, wherein the polymer is a chain-extended aliphaticpolyester.

15. The process according to claim 9, wherein the degree of branching of the polymer is from 0.0005 to 1 mol/kg.

16. The process according to claim 9, wherein the number-average molecular weight of the polymer is in the range from 5000 to 1 000 000 daltons.

17. The process according to claim 9, wherein the weight-average molecular weight of the polymer is in the range from 10 000 to 5 000 000 daltons.

18. The process according to claim 9, wherein the polymer has a zero-shear viscosity $\eta_0$ in the range from 60 to 10 000 Pa·s at 180° C.

19. The process according to claim 9, wherein the surfactant substance comprises at least one protective colloid.

20. The process according to claim 19, wherein the protective colloid is a neutral polymer bearing OH groups.

21. The process according to claim 20, wherein the polymer bearing OH groups is selected from polyvinyl alcohol, partially hydrolyzed polyvinyl acetate, polyalkylene oxides, and polysaccharides.

22. The process according to claim 19, wherein the protective colloid is a water-soluble copolyesters which have an amount of from 0.3 to 1.5 mmol/g of aromatically bonded sulfonate groups in their salt form.

23. The process according to claim 19, wherein the surfactant substance comprises at least one anionic emulsifier which has a sulfated oligo-$C_2$-$C_3$-alkylene oxide group.

24. The process according to claim 23, wherein the aqueous dispersion medium comprises a concentration of from 0.5 to 20% by weight of the surfactant substance.

25. An aqueous polymer dispersion obtained by the process according to claim 24.

26. A process for producing aqueous dispersions of thermoplastic polymers which have a plurality of ester groups and/or carbonate groups in the main polymer chain and which have an acid number of less than 3 mg KOH/g, and which have a zero-shear viscosity $\eta_0$ of at least 60 Pa·s at 180° C., which comprises introducing a composition which comprises the polymer and which is composed of at least 99% by weight of the polymer at a temperature above the melting or softening point of the polymer, into an aqueous dispersion medium which comprises at least one surfactant substance, and the resultant aqueous emulsion of the polymer is quenched, wherein the introduction of the polymer into the aqueous dispersion medium is carried out in a mixing apparatus which has at least one rotor-stator mixer.

27. The process according to claim 26, wherein the rotor-stator mixer has means of generating cavitation forces.

28. The process according to claim 26, wherein the rotor-stator mixer is a toothed-ring dispersing machine.

29. The process according to claim 28, wherein the toothed-ring dispersing machine has a conical stator with a concentric frustoconical recess and a likewise concentric conical rotor, wherein the rotor protrudes into the frustoconical operating chamber of the stator in such a way as to form an annular operating chamber, into which, on the side of the rotor and of the stator, teeth protrude, and are arranged respectively in the form of one or more coaxial toothed rings on the rotor and on the stator, in such a way that the toothed rings undergo mutual offset intermeshing.

30. The process according to claim 26, wherein the introduction of the melt into the aqueous dispersion medium takes place at a temperature which is at least 20 K above the melting or softening point of the polymer.

31. The process according to claim 26, wherein the polymer is a polyester, polyetherester, polyesteramide, polycarbonate, or mixtures of these.

32. The process according to claim 31, wherein the polymer is an aliphatic polyester, aliphatic copolyester, aliphatic-aromatic copolyester, or mixtures of these.

33. The process according to claim 26, wherein the polymer is a polyester which in essence is composed of:

a) at least one dicarboxylic acid component A, which is composed of a1) at least one aliphatic or cycloaliphatic dicarboxylic acid or ester-forming derivatives thereof, or a mixture thereof, and a2) optionally one or more aromatic dicarboxylic acids or ester-forming derivatives thereof, or a mixture thereof;

b) at least one diol component B, selected from aliphatic and cycloaliphatic diols and mixtures thereof;

c) optionally one or more further bifunctional compounds C which react with carboxylic acid groups or with hydroxy groups to form bonds; and d) optionally one or more compounds D which have at least 3 functionalities which react with carboxylic acid groups or with hydroxy groups to form bonds;

wherein the compounds a1), a2), B), C), and D) comprise not more than 3 mol %, based on the total amount of compounds of component A, of compounds which have one or more sulfonic acid groups, and wherein the molar ratio of component A to component B is in the range from 0.4:1 to 1:1, and components A and B make up at least 80% by weight of the polyester.

34. The process according to claim 33, wherein the polymer is a polyester which in essence is composed of:

a) at least one dicarboxylic acid component A, which is composed of a1) from 35 to 90 mol % of at least one aliphatic or cycloaliphatic dicarboxylic acid or ester-forming derivatives thereof, or a mixture thereof, and a2) from 10 to 65 mol % of one or more aromatic dicarboxylic acids or ester-forming derivatives thereof, or a mixture thereof;

b) from 98 to 102 mol %, based on the total amount of components a1) and a2), of at least one diol component B, selected from aliphatic and cycloaliphatic diols and mixtures thereof;

c) from 0 to 2% by weight, based on the total weight of the polyester, of one or more further bifunctional compounds C which react with carboxylic acid groups or with hydroxy groups to form bonds; and d) from 0 to 2% by weight, based on the total weight of the polyester, of one or more compounds D which have at least 3 functionalities which react with carboxylic acid groups or with hydroxy groups to form bonds.

wherein the aromatic dicarboxylic acids a2) can comprise up to 3 mol %, based on the total amount of compounds of component A, of aromatic dicarboxylic acids which have one or more sulfonic acid groups.

35. The process according to claim 33, wherein the compounds a1), a2), B), C), and D) comprise no compounds which have one or more sulfonic acid groups.

36. The process according to claim 33, wherein the aromatic dicarboxylic acids a2) comprise 0.1 to 3 mol %, based on the total amount of compounds of component A, of compounds which have one or more sulfonic acid groups.

37. The process according to claim 32, wherein the polymer is a chain-extended aliphatic polyester.

38. The process according to claim 32, wherein the degree of branching of the polymer is from 0.0005 to 1 mol/kg.

39. The process according to claim 32, wherein the number-average molecular weight of the polymer is in the range from 5000 to 1 000 000 daltons.

40. The process according to claim 32, wherein the weight-average molecular weight of the polymer is in the range from 10 000 to 5 000 000 daltons.

41. The process according to claim 32, wherein the surfactant substance comprises at least one protective colloid and the protective colloid is a neutral polymer bearing OH groups.

42. The process according to claim 41, wherein the polymer bearing OH groups is selected from polyvinyl alcohol, partially hydrolyzed polyvinyl acetate, polyalkylene oxides, and polysaccharides.

43. The process according to claim 40, wherein the protective colloid is a water-soluble copolyesters which have an amount of from 0.3 to 1.5 mmol/g of aromatically bonded sulfonate groups in their salt form.

44. The process according to claim 40, wherein the surfactant substance comprises at least one anionic emulsifier which has a sulfated oligo-$C_2$-$C_3$-alkylene oxide group.

45. The process according to claim 44, wherein the aqueous dispersion medium comprises a concentration of from 0.5 to 20% by weight of the surfactant substance.

* * * * *